United States Patent
Li

(10) Patent No.: US 7,929,706 B2
(45) Date of Patent: Apr. 19, 2011

(54) ENCRYPTION KEY RESTORING METHOD, INFORMATION PROCESSING APPARATUS, AND ENCRYPTION KEY RESTORING PROGRAM

(75) Inventor: Bin Li, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 706 days.

(21) Appl. No.: 12/022,498

(22) Filed: Jan. 30, 2008

(65) Prior Publication Data

US 2008/0226080 A1 Sep. 18, 2008

(30) Foreign Application Priority Data

Mar. 16, 2007 (JP) ................. 2007-069645

(51) Int. Cl.
*H04L 9/00* (2006.01)
*H04L 9/08* (2006.01)
(52) U.S. Cl. ........................ 380/286; 380/277
(58) Field of Classification Search .................. None
See application file for complete search history.

(56) References Cited

U.S. PATENT DOCUMENTS

| | | | | |
|---|---|---|---|---|
| 7,242,768 B2* | 7/2007 | Challener | ............... | 380/44 |
| 7,415,115 B2* | 8/2008 | Ma | ............... | 380/286 |
| 2003/0097580 A1* | 5/2003 | Chang | ............... | 713/194 |
| 2005/0114688 A1* | 5/2005 | Leis et al. | ............... | 713/193 |
| 2005/0129244 A1* | 6/2005 | Catherman et al. | ............... | 380/277 |
| 2007/0014416 A1* | 1/2007 | Rivera et al. | ............... | 380/286 |
| 2008/0069361 A1* | 3/2008 | Cho et al. | ............... | 380/277 |

FOREIGN PATENT DOCUMENTS

| | | |
|---|---|---|
| EP | 1 059 761 A1 | 12/2000 |
| JP | 2002-24091 | 1/2002 |
| JP | 2004-282391 | 10/2004 |
| JP | 2006-163956 | 6/2006 |

* cited by examiner

*Primary Examiner* — Kambiz Zand
*Assistant Examiner* — William S Powers
(74) *Attorney, Agent, or Firm* — Oblon, Spivak, McClelland, Maier & Neustadt, L.L.P.

(57) ABSTRACT

A disclosed encryption key restoring method enables restoration of an encryption key in the event of inability to use the encryption key stored in a secure memory of an information processing apparatus, in which data encrypted by the encryption key is stored in an internal storage unit. A disclosed information processing apparatus includes a key management module that checks the validity of the encryption key. If the encryption key is not valid, the key management module acquires a restore key for the encryption key from outside the information processing apparatus, and checks the validity of the restore key. If the restore key is valid, the key management module stores it in the secure memory, and reboots the information processing apparatus in a normal mode.

10 Claims, 26 Drawing Sheets

SYSTEM STARTS UP NORMALLY

ENCRYPTION KEY RESTORING METHOD, INFORMATION PROCESSING APPARATUS, AND ENCRYPTION KEY RESTORING PROGRAM

BACKGROUND OF THE INVENTION

1. Field of the Invention

The present invention relates to encryption key restoring methods, information processing apparatus, and encryption key restoring programs. More particularly, it relates to an encryption key restoring method, an information processing apparatus, and an encryption key restoring program whereby an encryption key used for encrypting data stored in an internal storage unit can be restored.

2. Description of the Related Art

In conventional information processing apparatus, it is often required to encrypt internally stored data and save it in a hard disk drive (HDD), an NVRAM, or the like. For example, Japanese Laid-Open Patent Application Nos. 2002-024091 and 2005-158043 disclose methods for protecting data saved in such a storage unit by encrypting the data. In information processing apparatus incorporating such methods, an encryption key used for data encryption is conventionally stored in a TPM (Trusted Platform Module) so as to prevent the encryption key from being compromised.

In an information processing apparatus in which an encryption key for data stored in the HDD, NVRAM, or the like is stored in a TPM, it is difficult to decrypt the data stored even if the HDD or NVRAM is stolen, for example, because the TPM in which the encryption key is stored is an integral part of a controller board.

However, in the above information processing apparatus, if the controller board were to be replaced due to a defective component or an end of life of a component, for example, the TPM with the stored encryption key in it would also be replaced. Thus, replacing the controller board leads to an inability to decrypt the data stored in the storage unit such as the HDD or NVRAM. Unless the data stored in the storage unit can be utilized, the conventional information processing apparatus cannot be even started up.

In practice, it is rare to replace only a defective component on the controller board in an information processing apparatus; generally, the entire controller board is replaced. While it can be expected that the replacement of the controller board will occur frequently in information processing apparatus, it is inconvenient if the problem of inability to decrypt the data stored in the HDD or NVRAM or the like presents itself whenever the controller board is replaced.

SUMMARY OF THE INVENTION

It is a general object of the invention to overcome the aforementioned problems of the conventional art.

A more specific object of the invention is to provide an encryption key restoring method, an information processing apparatus, and an encryption key restoring program whereby an encryption key can be restored in case an encryption key stored in a secure memory should become unusable.

In one aspect, the invention provides an encryption key restoring method for an information processing apparatus comprising a secure memory in which an encryption key is stored and an internal storage unit in which data encrypted by the encryption key is stored. The information processing apparatus further comprises a key management module. The method comprises the key management module carrying out an encryption key checking step of checking the validity of the encryption key; a restore key checking step of acquiring, in the absence of validity in the encryption key, a restore key for the encryption key from outside the information processing apparatus and checking the validity of the restore key; an encryption key restoring step of storing, in the presence of validity in the restore key, the restore key in the secure memory; and a normal startup instructing step of rebooting the information processing apparatus in a normal mode.

In another aspect, the invention provides an information processing apparatus comprising a secure memory in which an encryption key is stored and an internal storage unit in which data encrypted with the encryption key is stored. The apparatus further comprises a key management module which comprises an encryption key checking unit configured to check the validity of the encryption key; a restore key checking unit configured to, in the absence of validity in the encryption key, acquire a restore key for the encryption key from outside the information processing apparatus, and check the validity of the restore key; an encryption key restoring unit configured to store, in the presence of validity in the restore key, the restore key in the secure memory; and a normal startup instruction unit configured to reboot the information processing apparatus in a normal mode.

The constituent components, representations or any combination thereof of the present invention may be embodied in various other methods, apparatus, systems, computer programs, recording media, data structure, and so on.

In accordance with the present invention, an encryption key can be restored in the event of inability to use an encryption key stored in a secure memory.

These and other objects, advantages and features of the invention are described in conjunction with the accompanying drawings.

DETAILED DESCRIPTION OF THE PREFERRED EMBODIMENTS

In the following, the present invention is described by way of preferred embodiments, with reference made to the drawings. While the following description of the embodiments makes reference to information processing apparatus, the present invention may be embodied in image processing apparatus, such as multifunction peripherals (MFPs), which combine the functions of a plotter, a scanner, etc.

Embodiment 1

Figure 1:
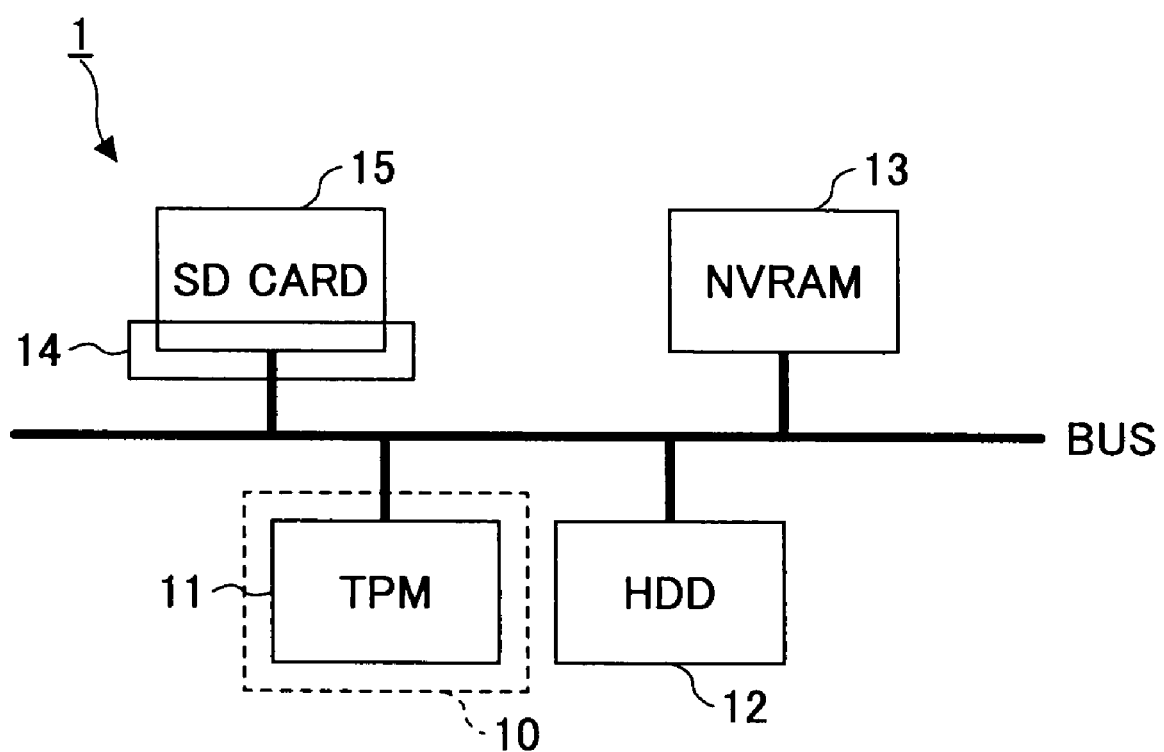
FIG. 1 shows a hardware configuration of an information processing apparatus according to an embodiment of the present invention.

FIG. 1 shows a hardware configuration of an information processing apparatus according to an embodiment of the present invention. The information processing apparatus 1 comprises a controller board 10, a TPM 11, an HDD 12, an NVRAM 13, an SD card reader 14, and an SD card 15 inserted in the SD card reader 14. The controller board 10, TPM 11, HDD 12, NVRAM 13, and SD card reader 14 are connected via a bus (BUS).

The controller board 10 includes a CPU, a ROM, and a RAM, which are not shown, as well as the TPM 11. The controller board 10 may be a motherboard for generally controlling the overall information processing apparatus 1. The CPU performs various operations. The ROM stores programs. The RAM saves or temporarily stores a program or data.

The TPM 11 is realized with a chip directly mounted on the controller board 10. Japanese Laid-Open Patent Application No. 2004-282391 describes encryption of information using a TPM (Trusted Platform Module) in a PC according to TCPA (Trusted Computing Platform Alliance) specifications. The TPM 11 is an example of a secure memory.

The HDD 12 is a storage device for retaining large volumes of data. The NVRAM 13 is a nonvolatile memory. The NVRAM 112 is configured to retain various parameters necessary for starting up the information processing apparatus in a normal mode, for example. The SD card reader 14 is configured to write or read data into or from the inserted SD card 15. The SD card 15 is a memory card as an example of an external storage medium. The SD card 15 may be configured to be inserted into the SD card reader 14 only when necessary.

Figure 2:
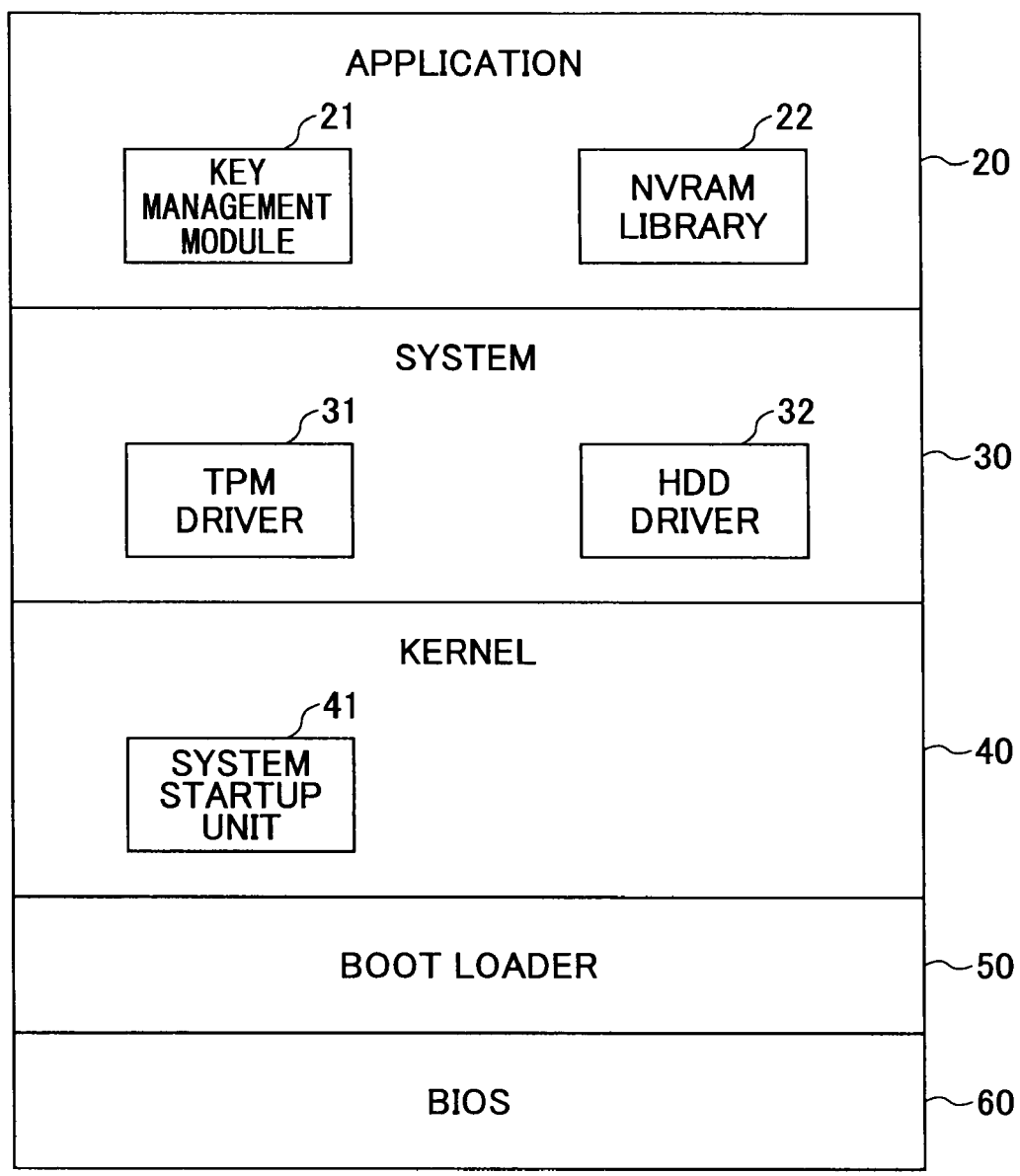
FIG. 2 shows a software configuration of the information processing apparatus when started up in a normal mode.

FIG. 2 shows a software configuration of the information processing apparatus 1 when started up in the normal mode. It comprises an application 20, a system 30, a kernel 40, a boot loader 50, and a BIOS 60. The application 20 includes a key management module 21 and an NVRAM library 22. The system 30 includes a TPM driver 31 and an HDD driver 32. The kernel 40 includes a system startup unit 41.

The BIOS (Basic Input/Output System) 60 reads the boot loader 50 for startup. The boot loader 50 reads the kernel 40 and the system 30 to start up the kernel 40 and the system 30. The kernel 40 starts up the system startup unit 41. The system startup unit 41 starts up the application 20 managed by the system 30.

Figure 3:
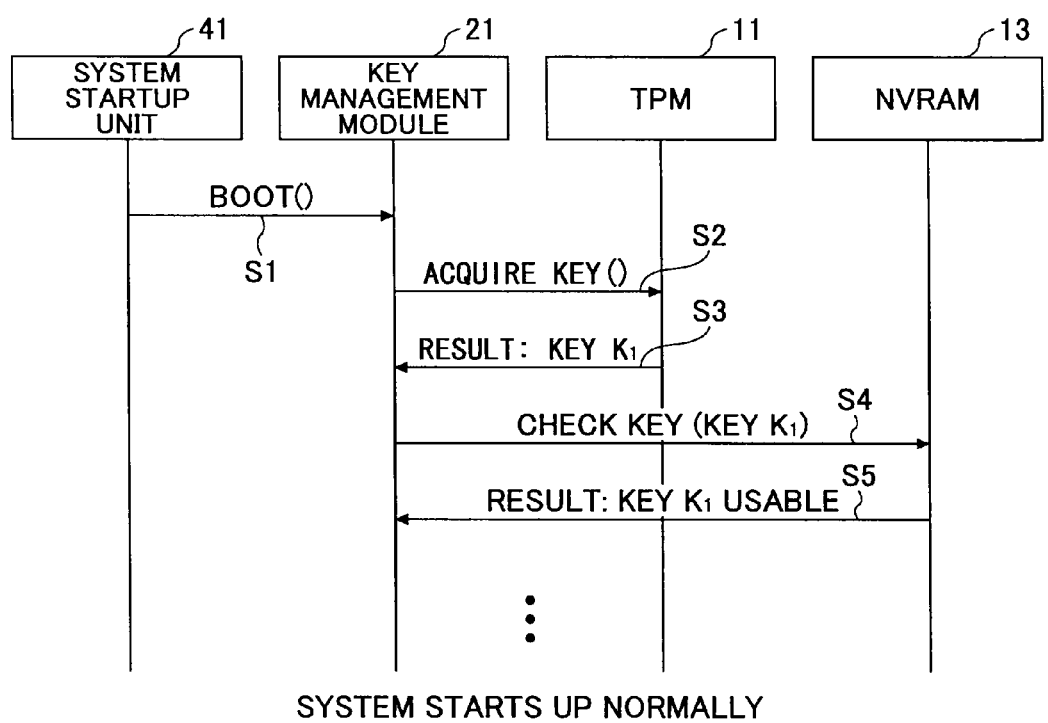
FIG. 3 shows sequence chart of a process of starting up the information processing apparatus in the normal mode.

FIG. 3 shows a sequence chart of a process of starting up the information processing apparatus in the normal mode. Upon startup, the system startup unit 41 starts up the key management module 21 in the application 20 in step S1.

In steps S2 and S3, the key management module 21 acquires an encryption key from the TPM 11. In steps S4 and S5, the key management module 21 checks the validity of the encryption key by determining whether the data stored in the NVRAM 13 can be correctly decrypted using the encryption key.

For example, if a character string in clear text form decrypted from an encrypted text stored in the NVRAM 13 corresponds to a predetermined clear-text character string, the key management module 21 determines that the encryption key acquired from the TPM 11 is a correct (valid) encryption key.

If the character string decrypted from the encrypted text stored in the NVRAM 13 does not correspond to the predetermined character string, the key management module 21 determines that the encryption key acquired from the TPM 11 is an invalid encryption key. If the encryption key acquired from the TPM 11 is determined to be a valid encryption key, the key management module 21 issues a normal startup instruction so as to start the information processing apparatus 1 in the normal mode.

Figure 4:
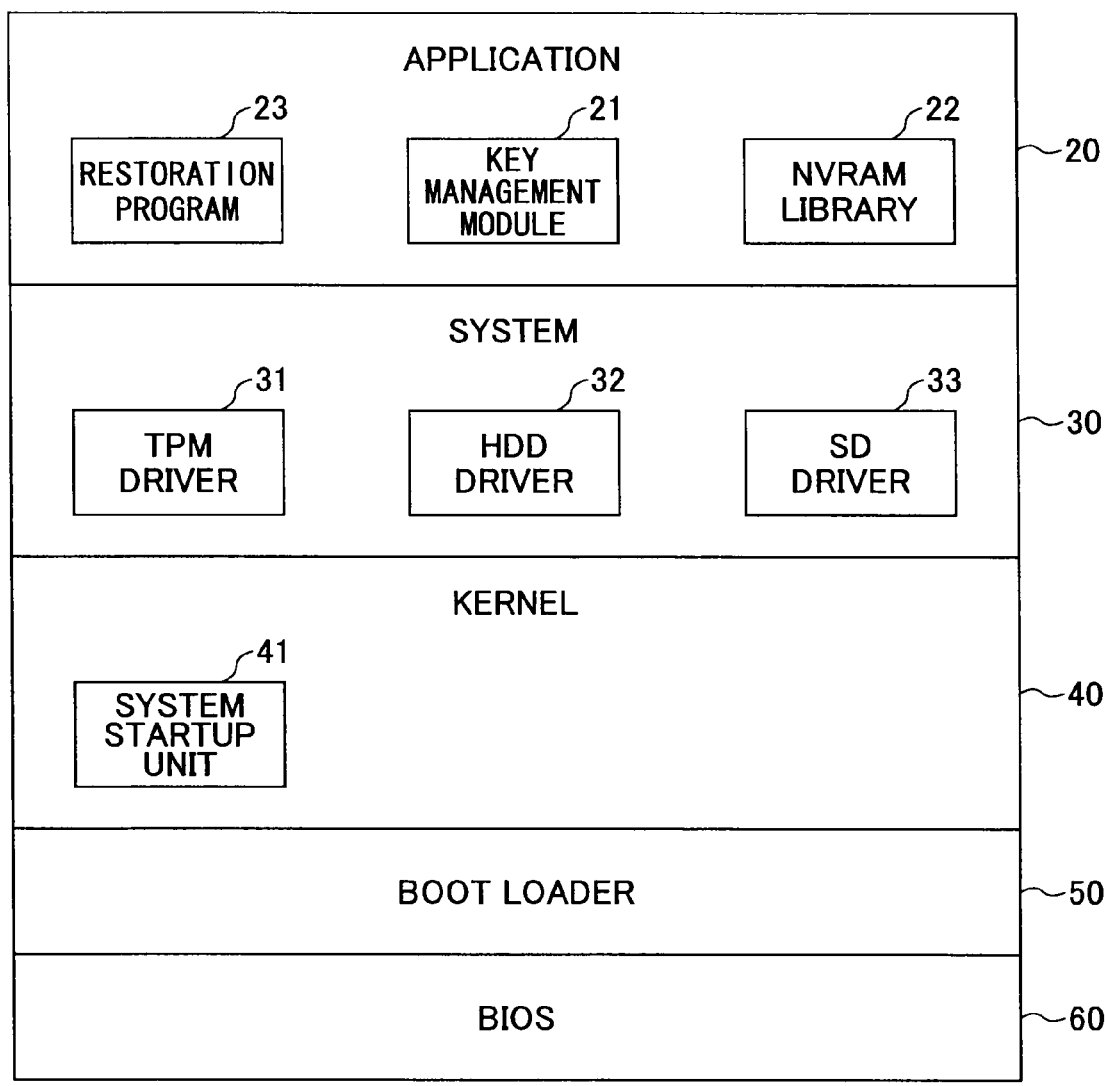
FIG. 4 shows a software configuration of the information processing apparatus when started up in a restore mode.

FIG. 4 shows a software configuration of the information processing apparatus when started up in a restore mode. The information processing apparatus 1 additionally comprises a restore program 23 and an SD driver 33 in the application 20 and the system 30, respectively, in the software configuration shown in FIG. 2.

Figure 5:
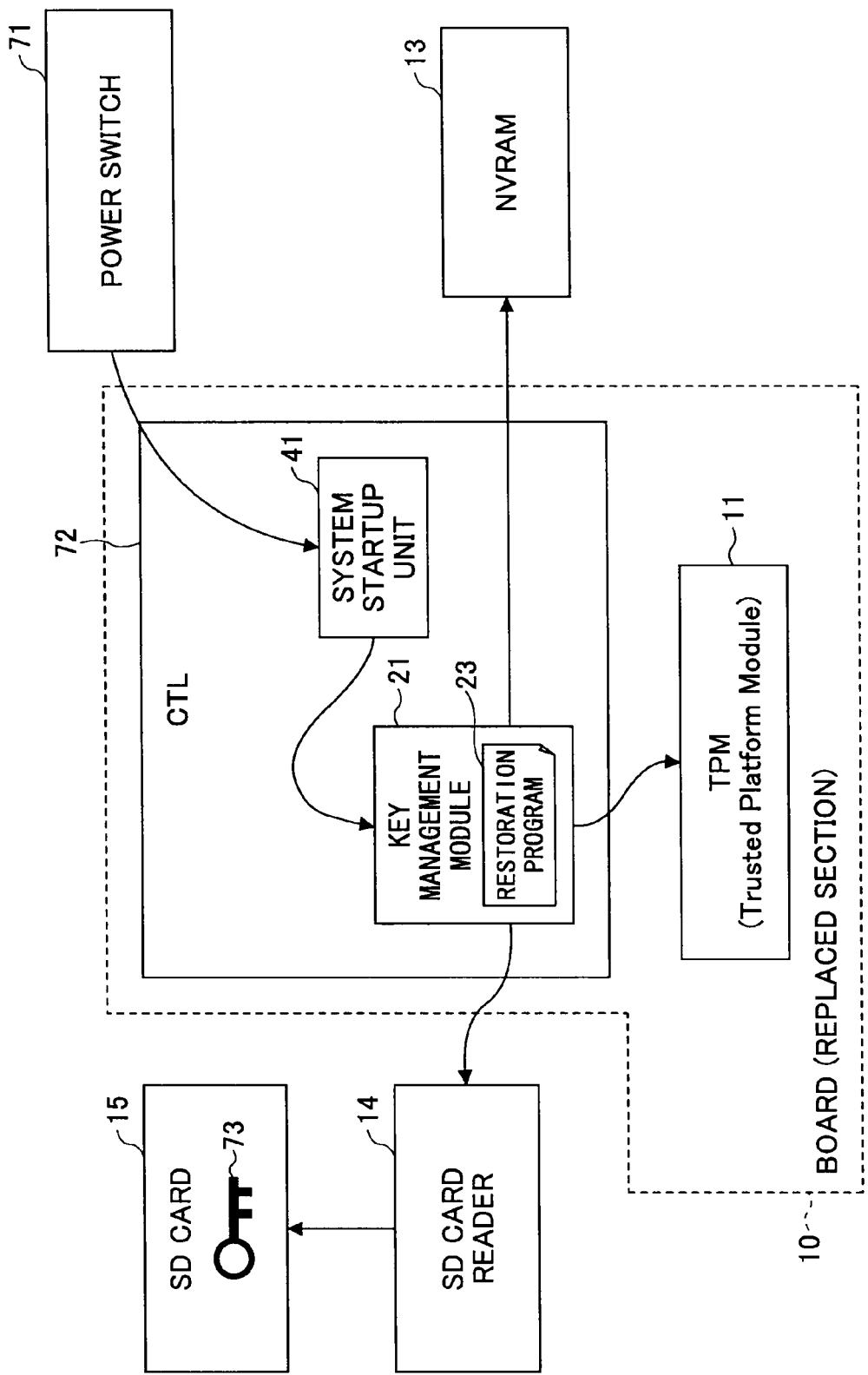
FIG. 5 shows a block diagram illustrating a process of starting up the information processing apparatus in the restore mode.

FIG. 5 shows a block diagram illustrating a sequence of starting the information processing apparatus in the restore mode. In the SD card 15, a restore key 73 for the encryption key used for encrypting the data stored in the NVRAM 13 is stored. An overall control software (CTL) 72, which includes the key management module 21 and the system startup unit 41, is configured to control the software as a whole.

Figure 6:
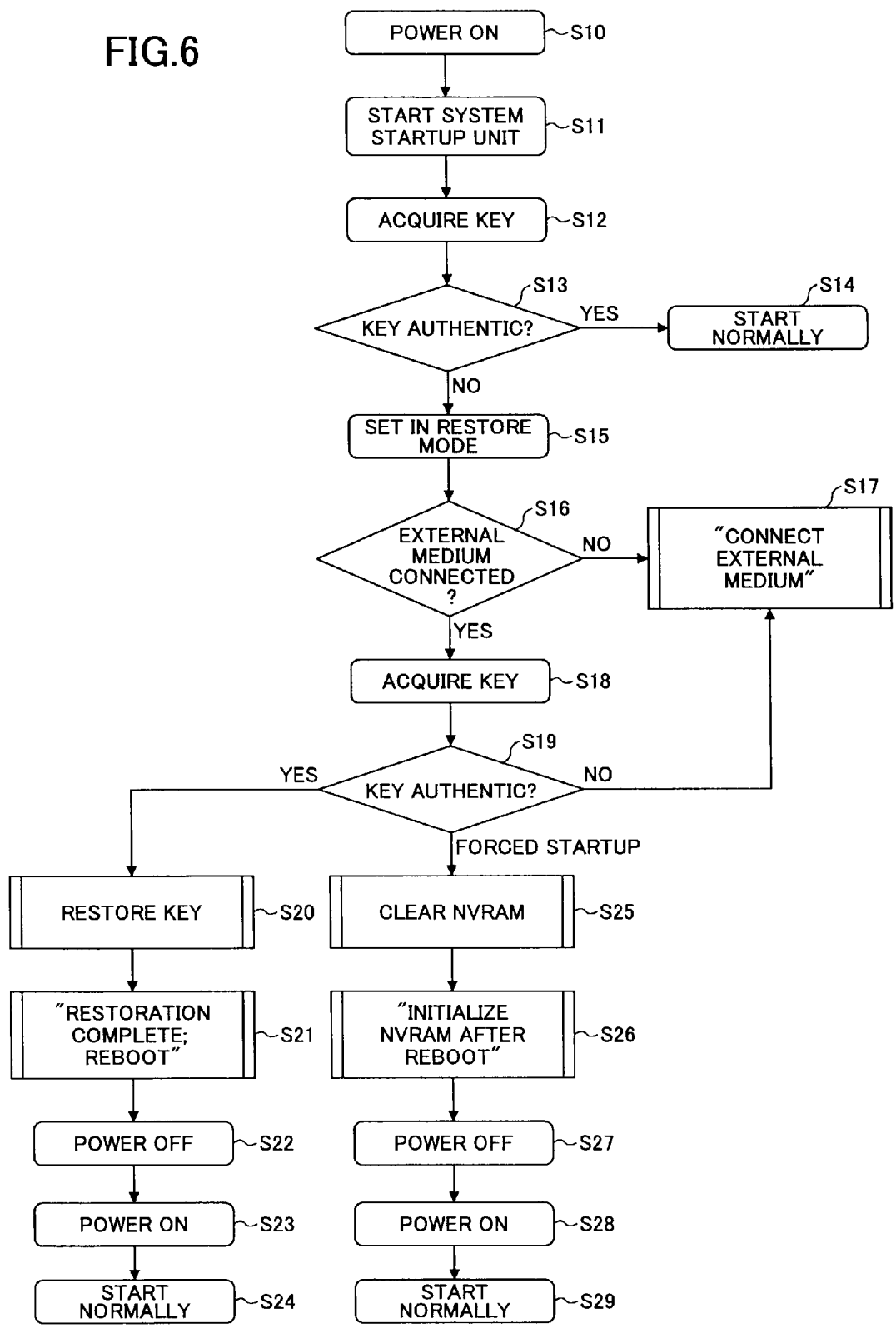
FIG. 6 shows a flowchart of a process of staring up the information processing apparatus of the present embodiment.

FIG. 6 shows a flowchart of a process of starting the information processing apparatus according to the present embodiment. In step S10, a power switch 71 to the information processing apparatus 1 is turned on to supply power to the apparatus. In step S11, the system startup unit 41 is started up. The system startup unit 41 then starts the key management module 21.

In step S12, the key management module 21 acquires the encryption key from the TPM 11 using the TPM driver 31. In step S13, the key management module 21 checks the validity of the encryption key by determining whether the data stored in the NVRAM 13 can be correctly decrypted with the encryption key.

If it is determined that the encryption key acquired from the TPM 11 is a valid encryption key ("YES" in S13), the key management module 21 in step S14 issues a normal startup instruction so as to start up the information processing apparatus 1 in the normal mode. On the other hand, if it is determined that the encryption key acquired from the TPM 11 is an invalid encryption key ("NO" in S13), the key management module 21 in step S15 sets the startup mode in the restore mode.

Thereafter, in step S16, the restore program 23 determines, using the SD driver 33, whether the SD card 15, which is an external storage medium, is inserted in the SD card reader 14 in such a way that data can be written or read into or from it.

If the SD card 15 is not connected ("NO" in S16), the restore program 23 notifies the operator in step S17 via a message to the effect that connection of an external storage medium is necessary. If the SD card 15 is connected ("YES" in S16), the restore program 23 acquires in step S18 the restore key 73 from the SD card 15 via the SD card reader 14, using the SD driver 33.

In step S19, the key management module 21 checks the validity of the encryption key based on whether the data stored in the NVRAM 13 can be correctly decrypted with the acquired restore key 73.

If the key management module 21 determines that the restore key 73 acquired from the SD card 15 is a valid encryption key, the routine proceeds to step S20 to restore the restore key 73 and store it in the TPM 11.

Thereafter, the routine proceeds to step S21 where the key management module 21 prompts the operator to reboot via a message to the effect that restoration has been completed and power should be turned off and then on again. In step S22, the information processing apparatus 1 is turned off by the operator.

In step S23, the operator turns on the power switch 71 again to supply power to the apparatus. In step S24, the key management module 21 issues a normal startup instruction so as to start up the information processing apparatus 1 in the normal mode.

If the key management module 21 determines that the encryption key acquired from the TPM 11 is an invalid encryption key, the apparatus still cannot be started up in the normal mode. Therefore, the routine returns to step S17 to notify the operator via the message that connection of an external storage medium is required. If the startup mode is set in a forced startup mode by the operator, the routine proceeds to step S25 where the key management module 21 deletes the data stored in the NVRAM 13. In step S26, the key management module 21 notifies the operator via a message to the effect that the NVRAM should be initialized after startup. Namely, the NVRAM 13 is restored back to factory shipped condition.

In step S27, the operator turns off power to the information processing apparatus 1. In step S28, the operator turns on the power switch 71 again so as to supply power. In step S29, the key management module 21 issues a normal startup instruction so as to start up the information processing apparatus 1 in the normal mode.

Figure 7:
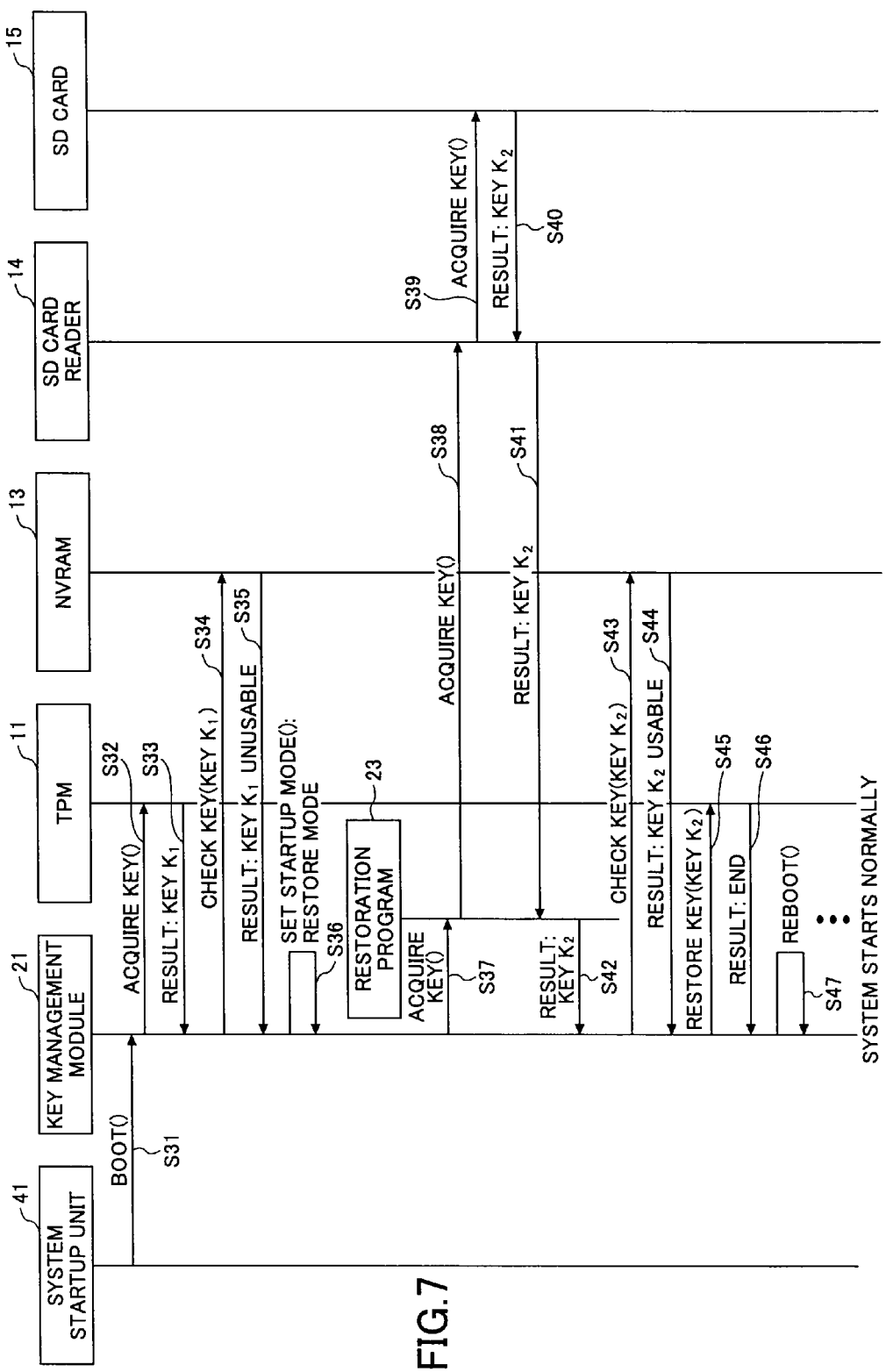
FIG. 7 shows a sequence chart of a process of starting up the information processing apparatus of the present embodiment.

FIG. 7 shows a sequence chart of a process of starting up the information processing apparatus of the present embodiment.

In step S31, the system startup unit 41 starts up the key management module 21. In steps S32 and S33, the key management module 21 acquires an encryption key from the TPM 11. In steps S34 and S35, the key management module 21 checks the validity of the encryption key by determining whether the data stored in the NVRAM 13 can be correctly decrypted with the encryption key acquired from the TPM 11. The key management module 21 determines that the encryption key acquired from the TPM 11 is an invalid encryption key. The routine proceeds to step S36 where the key management module 21 sets the startup mode in the restore mode.

In step S37, the key management module 21 demands that the restore program 23 acquire a key. In steps S38 to S41, the restore program 23, using the SD driver 33, acquires the restore key 73 from the SD card 15 via the SD card reader 14. The routine then proceeds to step S42 where the key management module 21 acquires the restore key 73 from the restore program 23.

In steps S43 and S44, the key management module 21 checks the validity of the encryption key by determining whether the data stored in the NVRAM 13 can be correctly decrypted with the acquired restore key 73.

If the key management module 21 determines that the restore key 73 acquired from the SD card 15 is a valid encryption key, the routine proceeds to steps S45 and S46 to restore the restore key 73 and store it in the TPM 11. Thereafter, the key management module 21 in step S47 prompts the operator to reboot, whereby the information processing apparatus 1 is started up in the normal mode.

Thus, in the information processing apparatus 1 according to Embodiment 1, an encryption key can be reintroduced by the restoration of the restore key 73, whereby the data in the NVRAM 13 can be continually utilized even after replacing the controller board 10. In Embodiment 1, a safe restoration of the encryption key can be ensured by having the external storage medium, such as the SD card 15, managed by an administrator or a service engineer.

Embodiment 2

An information processing apparatus 1 according to Embodiment 2 is similar to the information processing apparatus 1 of Embodiment 1 shown in FIGS. 1 to 3 in respects of the hardware configuration; the software configuration for startup in the normal mode; and the process for normal mode startup. Since the information processing apparatus of Embodiment 2 is also similar to the information processing apparatus of Embodiment 1 in terms of the drawings to which reference is made in the following, with the exception of some parts, descriptions are omitted whenever appropriate in the following.

Figure 8:
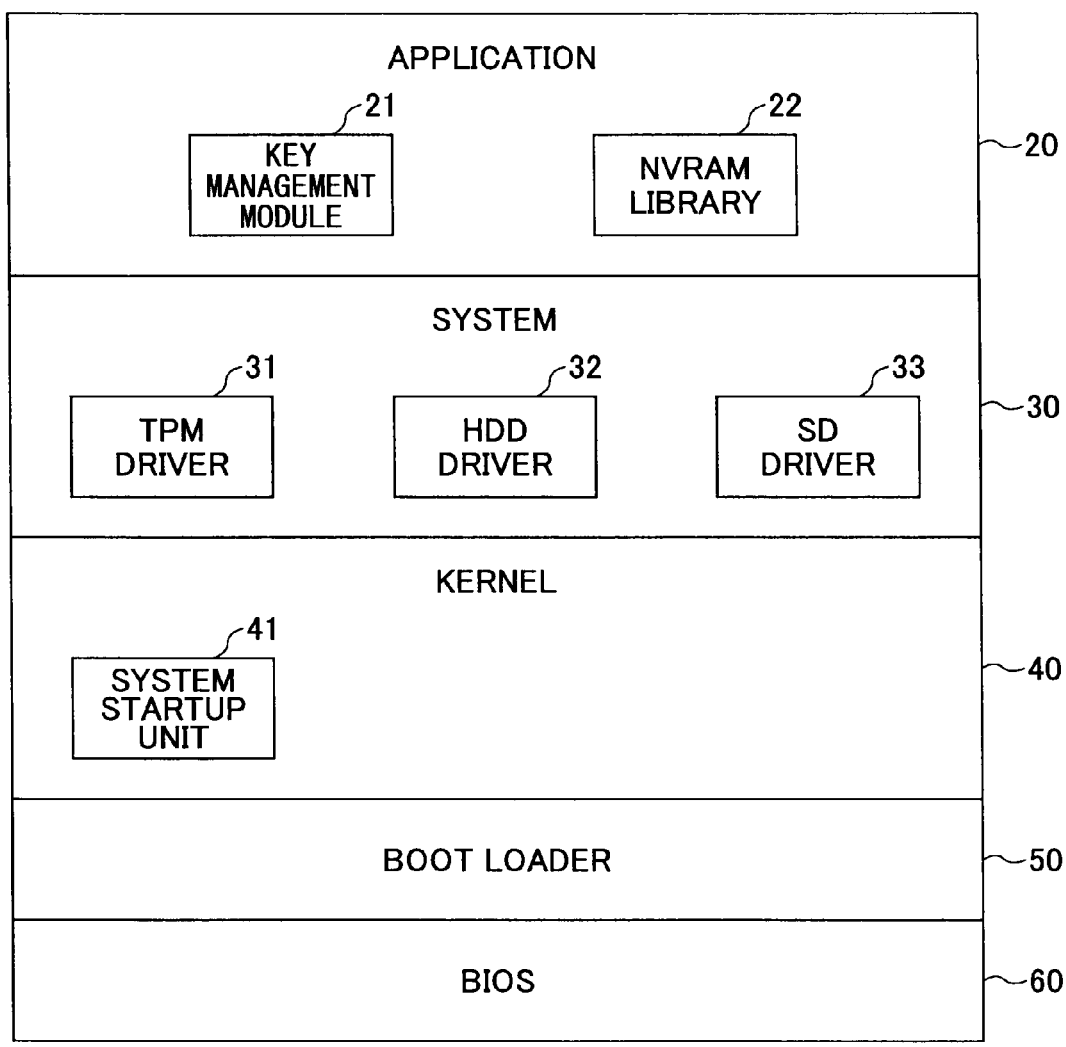
FIG. 8 shows a software configuration of an information processing apparatus according to another embodiment of the invention when started up in the restore mode.

FIG. 8 shows a software configuration of the information processing apparatus 1 when started up in the restore mode. The software configuration is the same as that shown in FIG. 4 with the exception that the restore program 23 is removed from the application 20.

Figure 9:
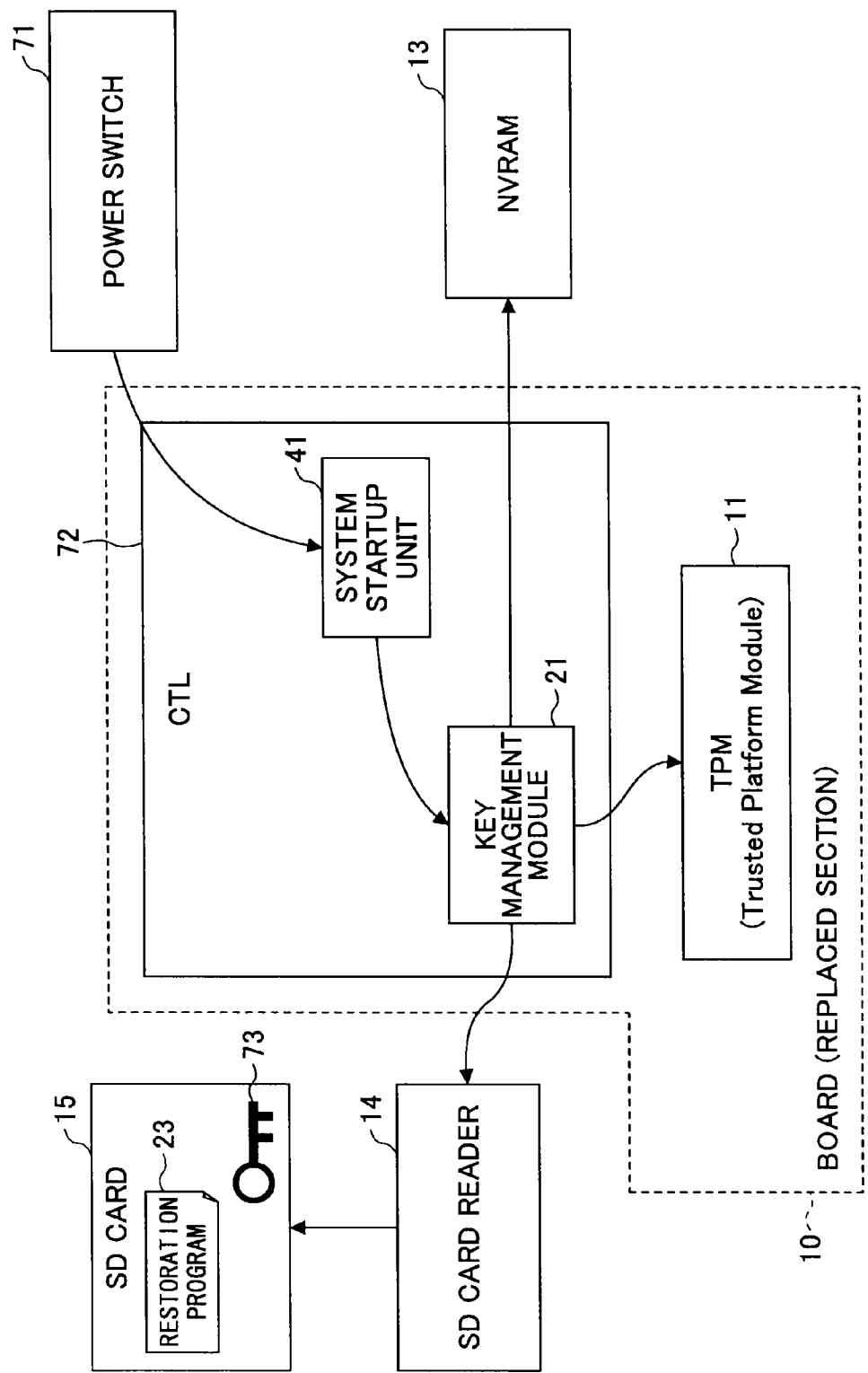
FIG. 9 shows a block diagram illustrating a process of starting up the information processing apparatus in the restore mode.

FIG. 9 shows a block diagram illustrating a sequence of starting up the information processing apparatus in the restore mode. The information processing apparatus 1 shown in FIG.

9 differs from the information processing apparatus 1 shown in FIG. 5 in that the restore program 23 is stored in the SD card 15.

Figure 10:
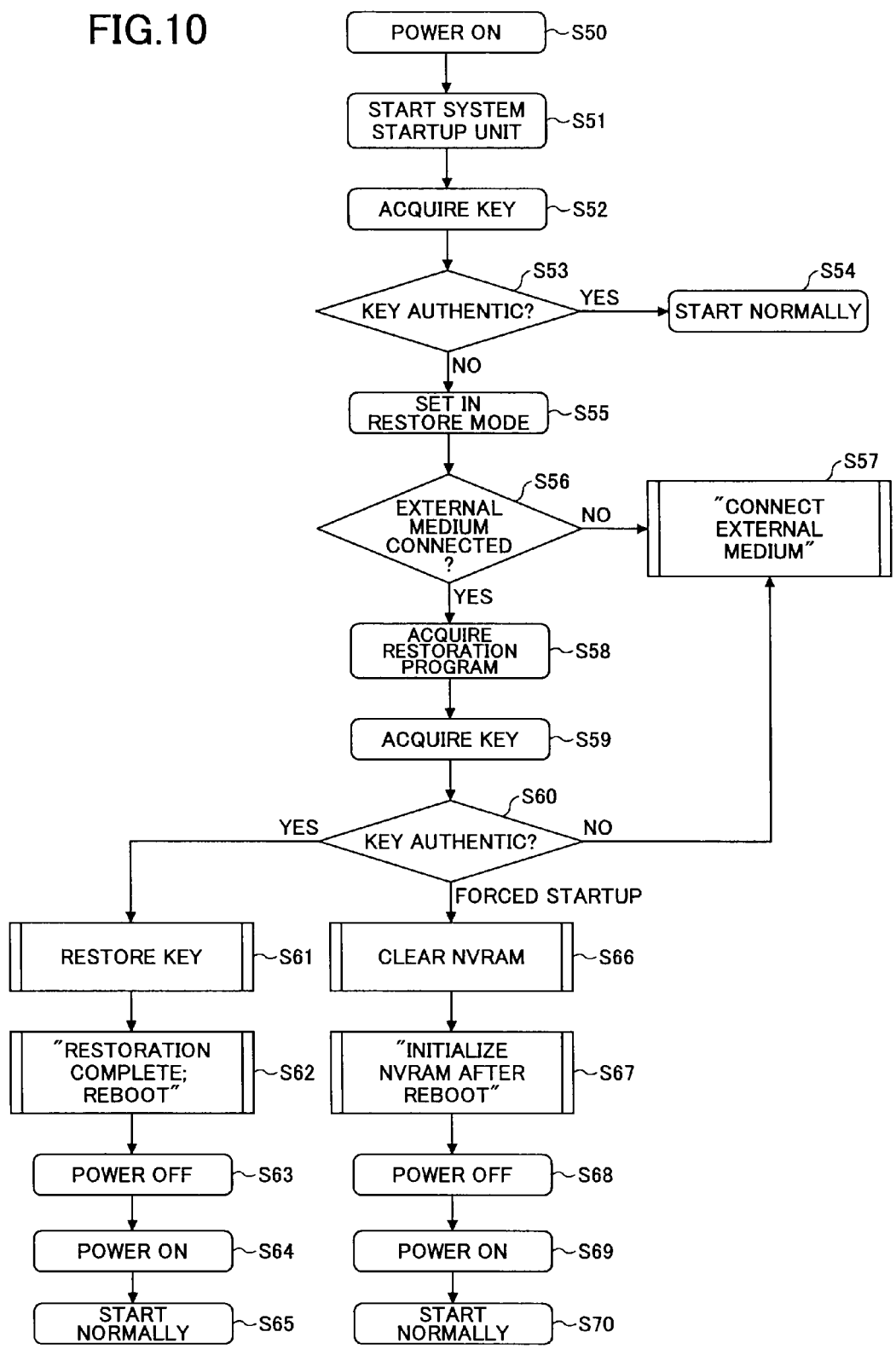
FIG. 10 shows a flowchart of a process of starting up the information processing apparatus of the present embodiment.

FIG. 10 shows a flowchart of a process of starting up the information processing apparatus of the present embodiment. The flowchart of FIG. 10 differs from that of FIG. 6 in that, after it is determined in step S56 that the SD card 15 is connected ("YES" in S56), the restore program 23 is acquired from the SD card 15 in step S58 prior to acquiring the restore key 73 from the SD card 15 in step S59.

Figure 11:
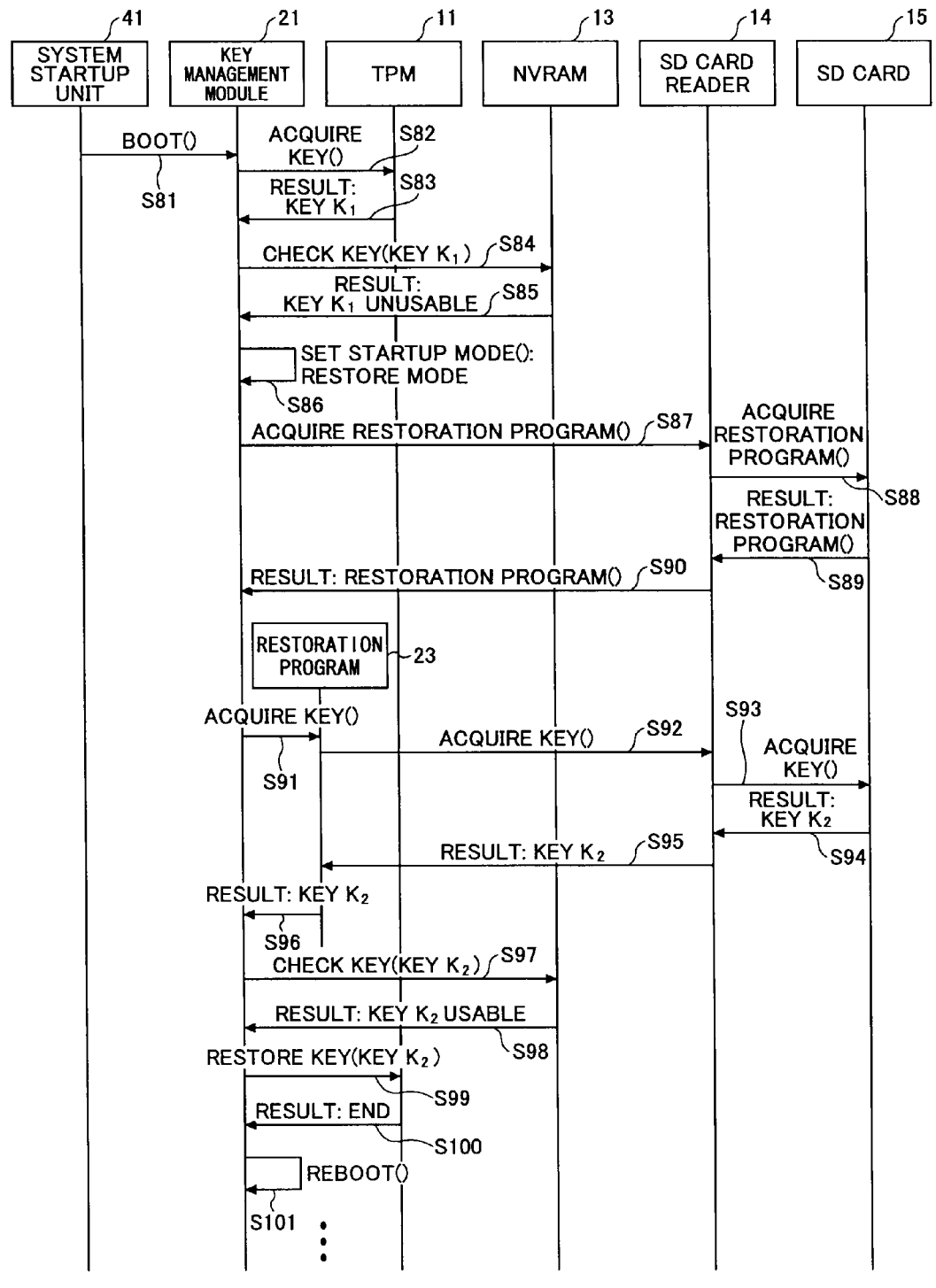
FIG. 11 shows a sequence chart of a process of staring up the information processing apparatus of the present embodiment.

FIG. 11 shows a sequence chart of a process of starting up the information processing apparatus of the present embodiment. The sequence chart of FIG. 11 differs from that of FIG. 7 in that, after setting the startup mode in the restore mode in step S86, the key management module 21 acquires the restore program 23 from the SD card 15 via the SD card reader 14 in steps S87 to S90.

In the information processing apparatus 1 according to Embodiment 2, since an encryption key can be reintroduced by the restoration of the restore key 73, the data in the NVRAM 13 can be continually utilized even after replacing the controller board 10. Furthermore, since the restore program 23 and the restore key 73 can be stored in the external storage medium, such as the SD card 15, the restore program 23 and the restore key 73 can be managed by an administrator or a service engineer. Thus, the restore program 23 can be readily modified, and the restore key 73 can be generated more independently of the restore program 23 than in the case where the restore program 23 is stored within the information processing apparatus 1.

Embodiment 3

An information processing apparatus 1 of Embodiment 3 is similar to the information processing apparatus 1 of Embodiment 1 shown in FIGS. 2 and 3 in respects of the software configuration when started up in the normal mode, and the process of starting up in the normal mode. Since the information processing apparatus 1 of Embodiment 3 is also similar to the information processing apparatus of Embodiment 1 in terms of the drawings to which reference is made in the following, with the exception of some parts, descriptions are omitted whenever appropriate in the following.

Figure 12:
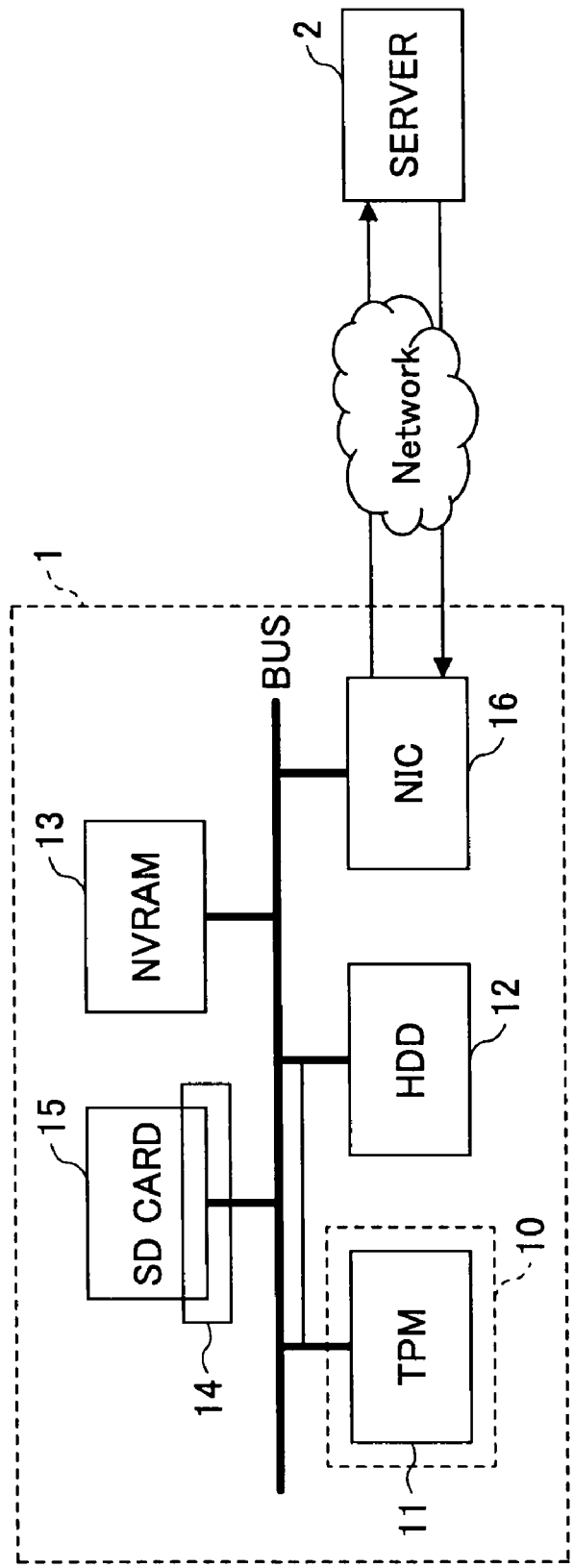
FIG. 12 shows a hardware configuration of the information processing apparatus according to another embodiment of the present embodiment.

FIG. 12 shows a hardware configuration of the information processing apparatus according to Embodiment 3. The information processing apparatus 1 shown in FIG. 12 differs from the information processing apparatus 1 shown in FIG. 1 in that the apparatus further comprises an NIC (network interface card) 16, which enables data communications with a server 2 via a network.

Figure 13:
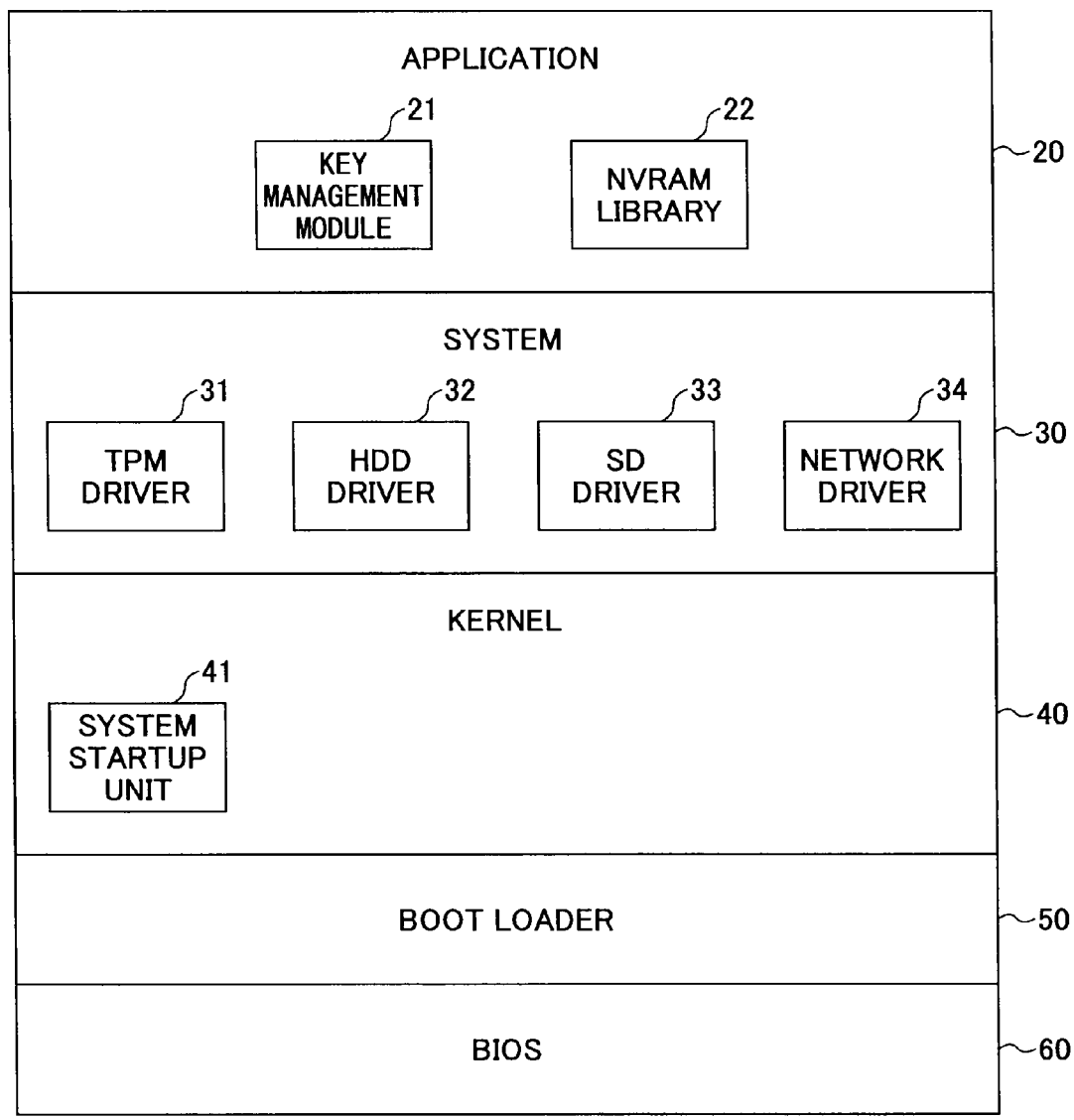
FIG. 13 shows a software configuration of the information processing apparatus when started up in the restore mode.

FIG. 13 shows a software configuration of the information processing apparatus when started up in the restore mode. The software configuration of FIG. 13 differs from that of FIG. 4 in that the restore program 23 is removed from the application 20 and a network driver 34 is added to the system 30.

Figure 14:
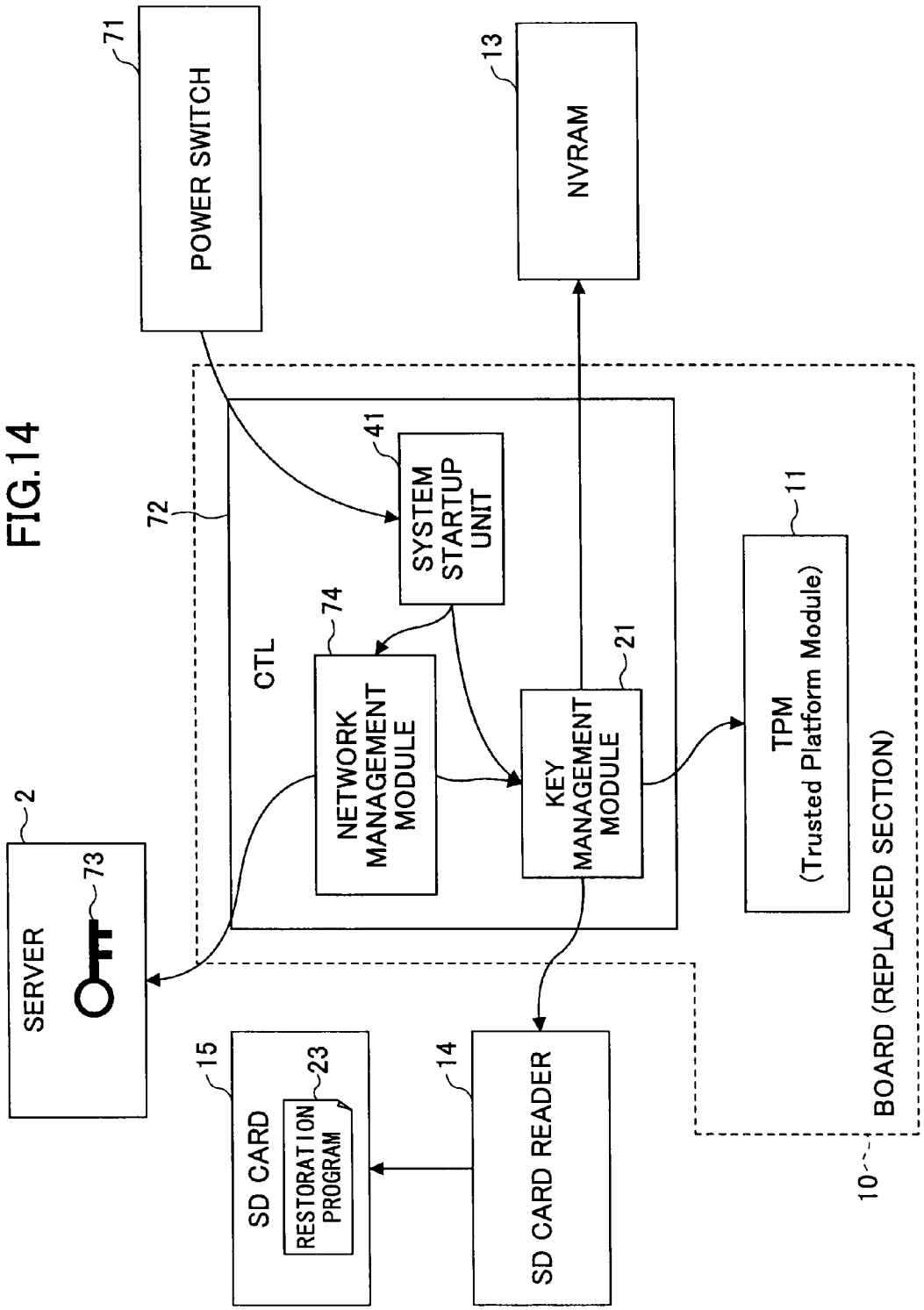
FIG. 14 shows a block diagram illustrating a process of starting up the information processing apparatus in the restore mode.

FIG. 14 shows a block diagram illustrating a sequence of starting up the information processing apparatus in the restore mode. The information processing apparatus 1 shown in FIG. 14 differs from the information processing apparatus 1 shown in FIG. 5 in that the restore program 23 is stored in the SD card 15 and that the restore key 73 is stored in the server 2, with which data communications can be performed using the network management module 74.

Figure 15:
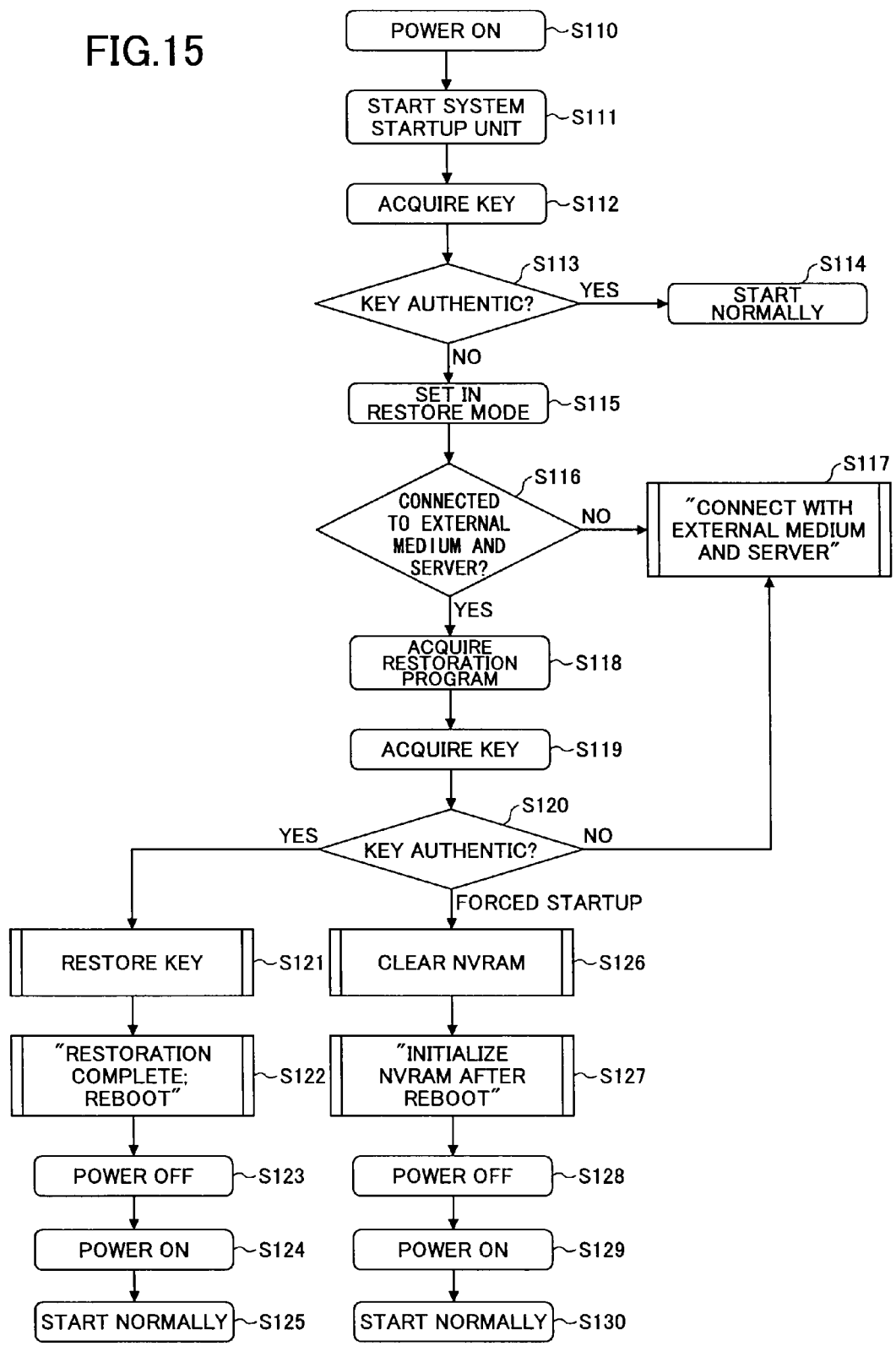
FIG. 15 shows a flowchart of a process of starting up the information processing apparatus of the present embodiment.

FIG. 15 shows a flowchart of a process of starting up the information processing apparatus of the present embodiment. In step S116, it is determined whether the SD card 15 and the server 2 are connected. If it is determined that the SD card 15 and the server 2 are not connected ("NO" in S116), the routine proceeds to step S117 where the operator is notified via a message to the effect that connection with an external storage medium and an external server is necessary. If it is determined that the SD card 15 and the server 2 are both connected ("YES" in S116), the restore program 23 is acquired from the SD card 15 in step S118 prior to acquiring the restore key 73 from the server 2 in step S119. In this respect, the flowchart of FIG. 15 differs from that of FIG. 6.

Figure 16:
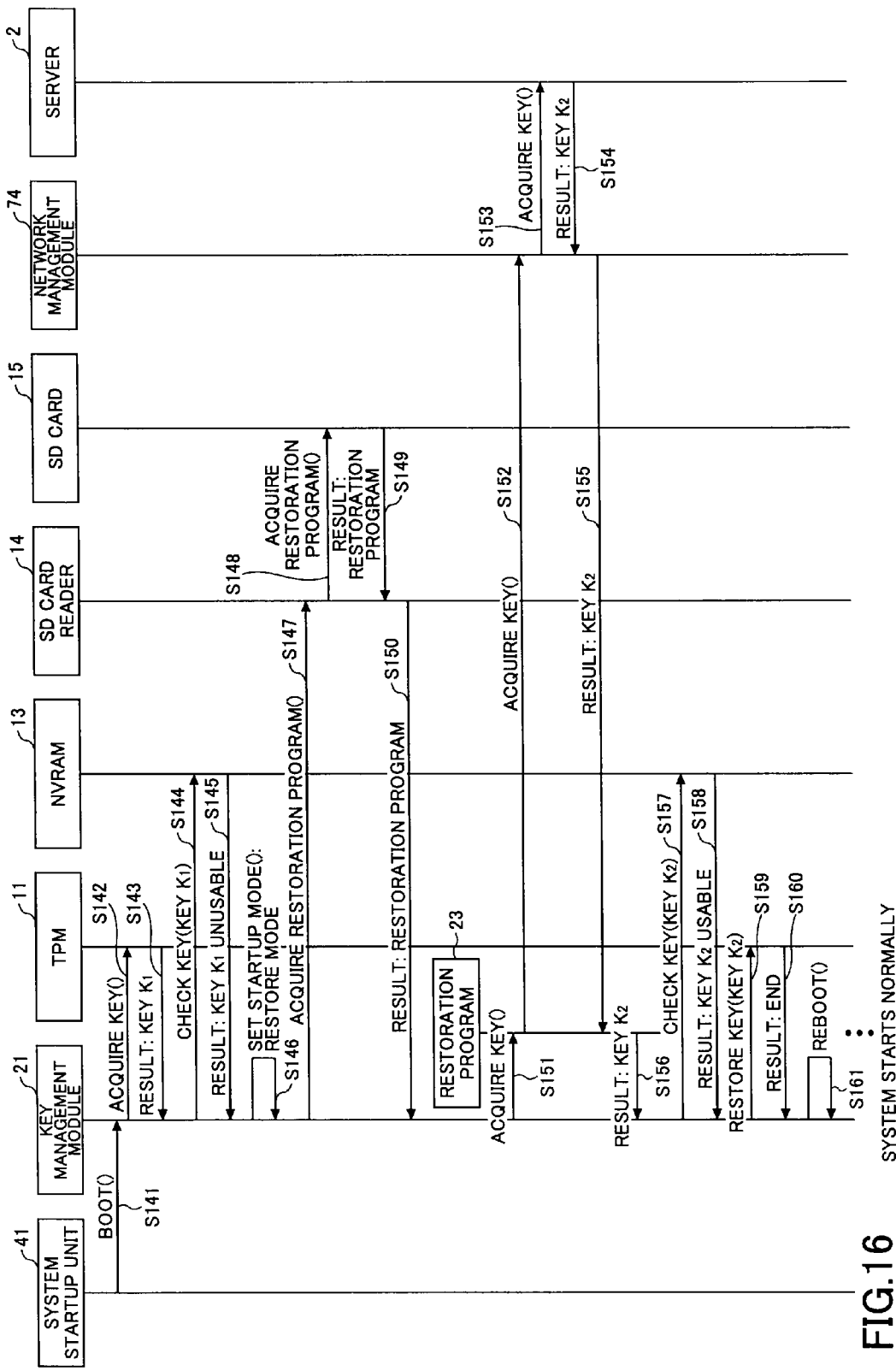
FIG. 16 shows a sequence chart of a process of starting up the information processing apparatus of the present embodiment.

FIG. 16 shows a sequence chart of a process of starting up the information processing apparatus of the present embodiment. After setting the startup mode in the restore mode in step S146, the key management module 21 acquires the restore program 23 from the SD card 15 via the SD card reader 14 in steps S147 to S150. In steps S151 to S156, the key management module 21 acquires the restore key 73 from the server 2.

Thus, in the information processing apparatus 1 of Embodiment 3, an encryption key can be reintroduced by the restoration of the restore key 73, so that the data in the NVRAM 13 can be continually utilized even after replacing the controller board 10. Furthermore, since the restore program 23 is stored in an external storage medium, such as the SD card 15, and the restore key 73 is stored in the external server 2, plural restore keys 73 can be centrally managed.

Embodiment 4

An information processing apparatus 1 according to Embodiment 4 is similar to the information processing apparatus 1 according to Embodiment 1 or 3 shown in FIGS. 1 to 3 and FIGS. 13 to 15 in respects of the hardware configuration; the software configuration when started up in the normal mode; the process of starting up in the normal mode; the software configuration when started up in the restore mode; and the process of starting up in the restore mode. Since the information processing apparatus 1 of Embodiment 4 is also similar to the information processing apparatus of Embodiment 3 in terms of the drawings to which reference is made in the following, with the exception of some parts, descriptions are omitted whenever appropriate in the following.

Figure 17:
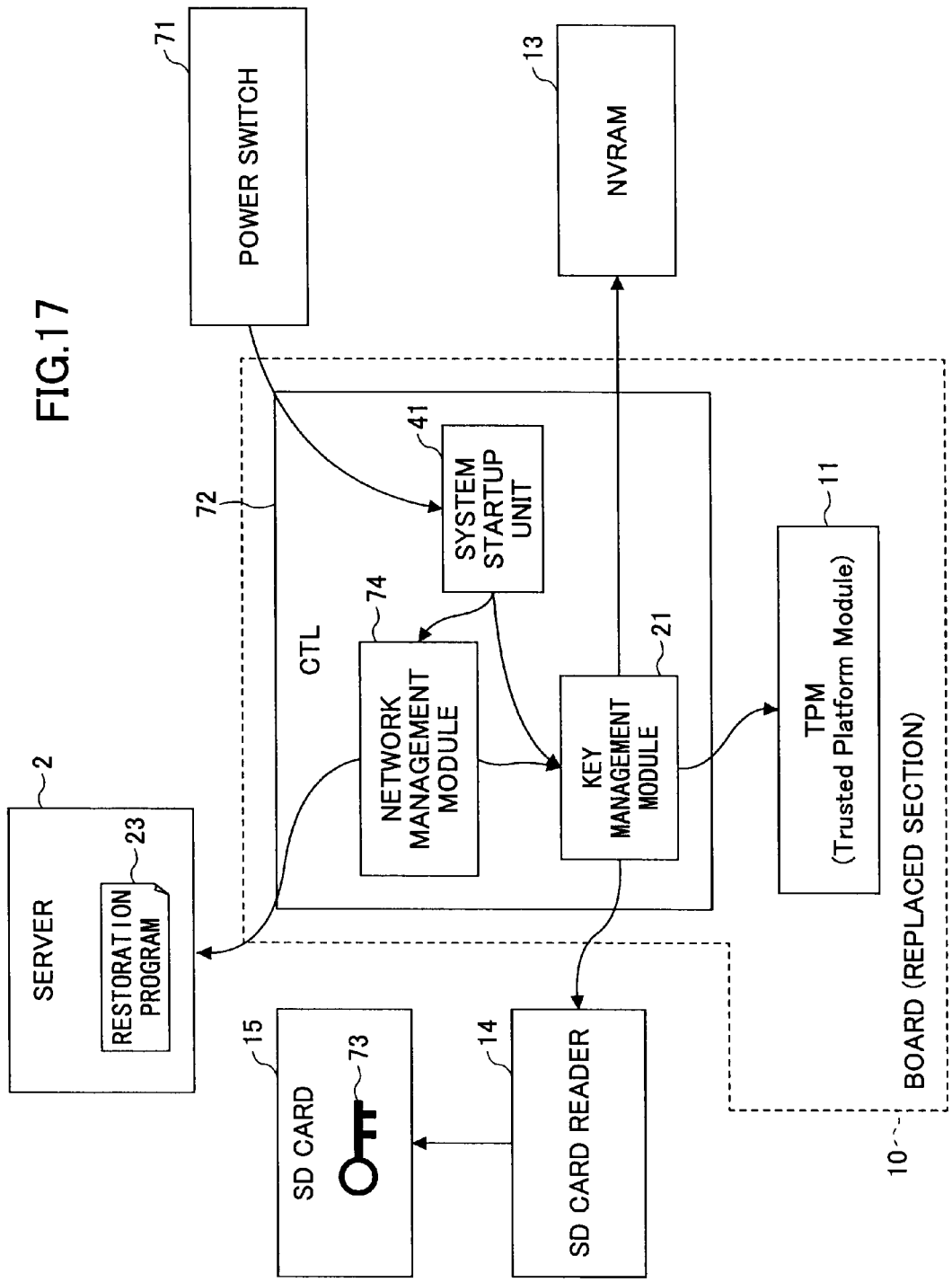
FIG. 17 shows a block diagram of a process of starting up the information processing apparatus in the restore mode.

FIG. 17 shows a block diagram illustrating a process of starting up the information processing apparatus in the restore mode. The information processing apparatus 1 differs from the information processing apparatus 1 shown in FIG. 14 in that the restore program 23 is stored in a server 2, with which data communications is enabled by a network management module 74, and that the restore key 73 is stored in the SD card 15.

Figure 18:
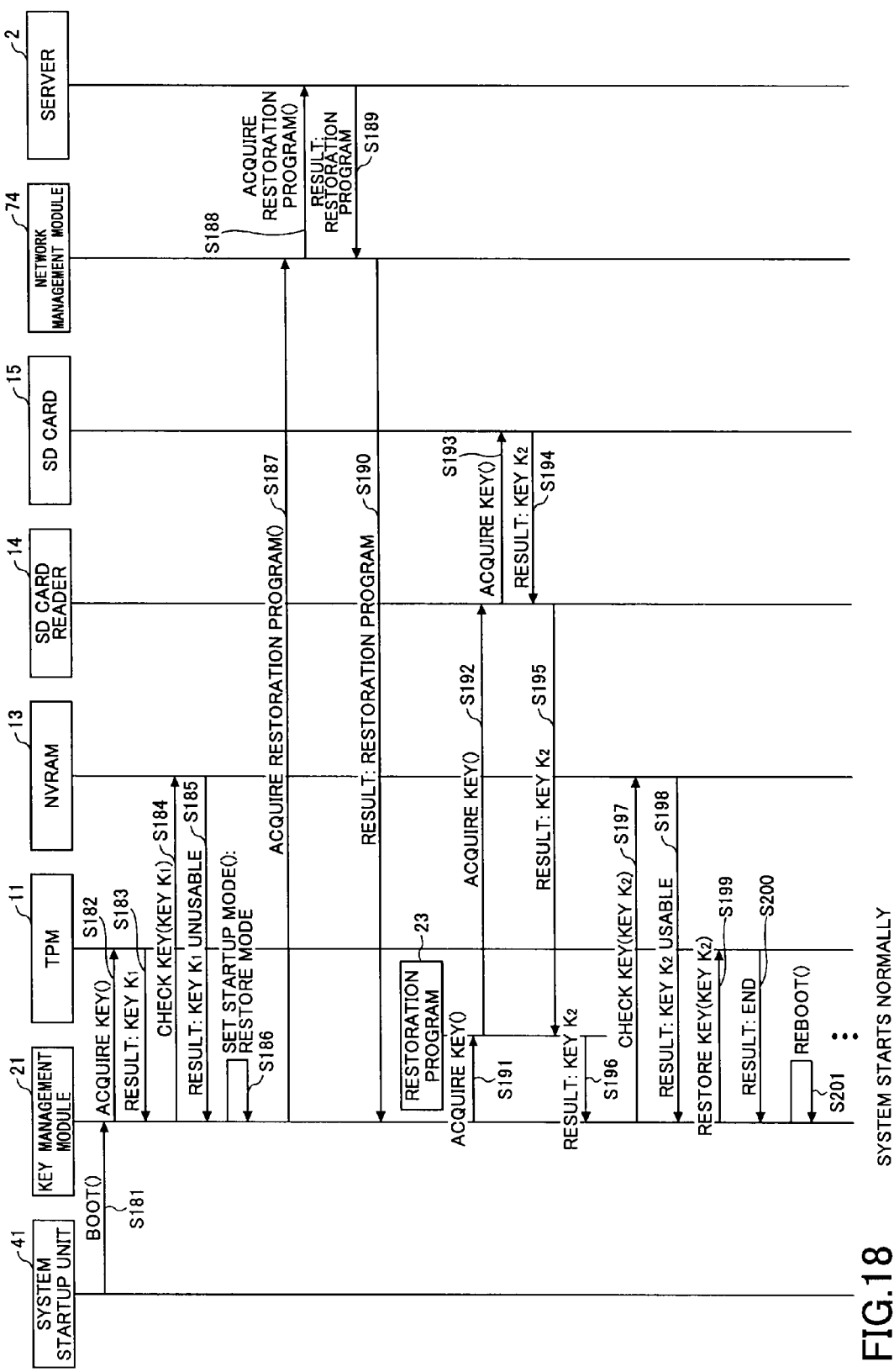
FIG. 18 shows a sequence chart of a process of starting up the information processing apparatus of the present embodiment.

FIG. 18 shows a sequence chart of a process of starting up the information processing apparatus of the present embodiment. After setting the startup mode in the restore mode in step S186, the restore program 23 is acquired from the server 2 in steps S187 to S190. In steps S191 to S196, the key management module 21 acquires the restore key 73 from the SD card 15 via the SD card reader 14.

In the information processing apparatus 1 of Embodiment 4, since an encryption key can be reintroduced by the restoration of the restore key 73, the data in the NVRAM 13 can be continually utilized even after replacing the controller board 10. Furthermore, in the information processing apparatus 1 of Embodiment 4, since the restore program 23 can be stored in the external server 2 and the restore key 73 can be stored in the external storage medium, such as the SD card 15, the restore program 23 can be centrally managed.

Embodiment 5

The information processing apparatus 1 according to Embodiment 5 is similar to the information processing apparatus 1 of Embodiment 1 or 3 shown in FIGS. 1 to 3 and FIG. 13 in respects of the hardware configuration; the software configuration when started up in the normal mode; the process of starting up in the normal mode; and the software configuration when started up in the restore mode. Since the information processing apparatus 1 of Embodiment 5 is also similar to the information processing apparatus 1 of Embodiment 3 in terms of the drawings to which reference is made in the following, with the exception of some parts, descriptions are omitted whenever appropriate in the following.

Figure 19:
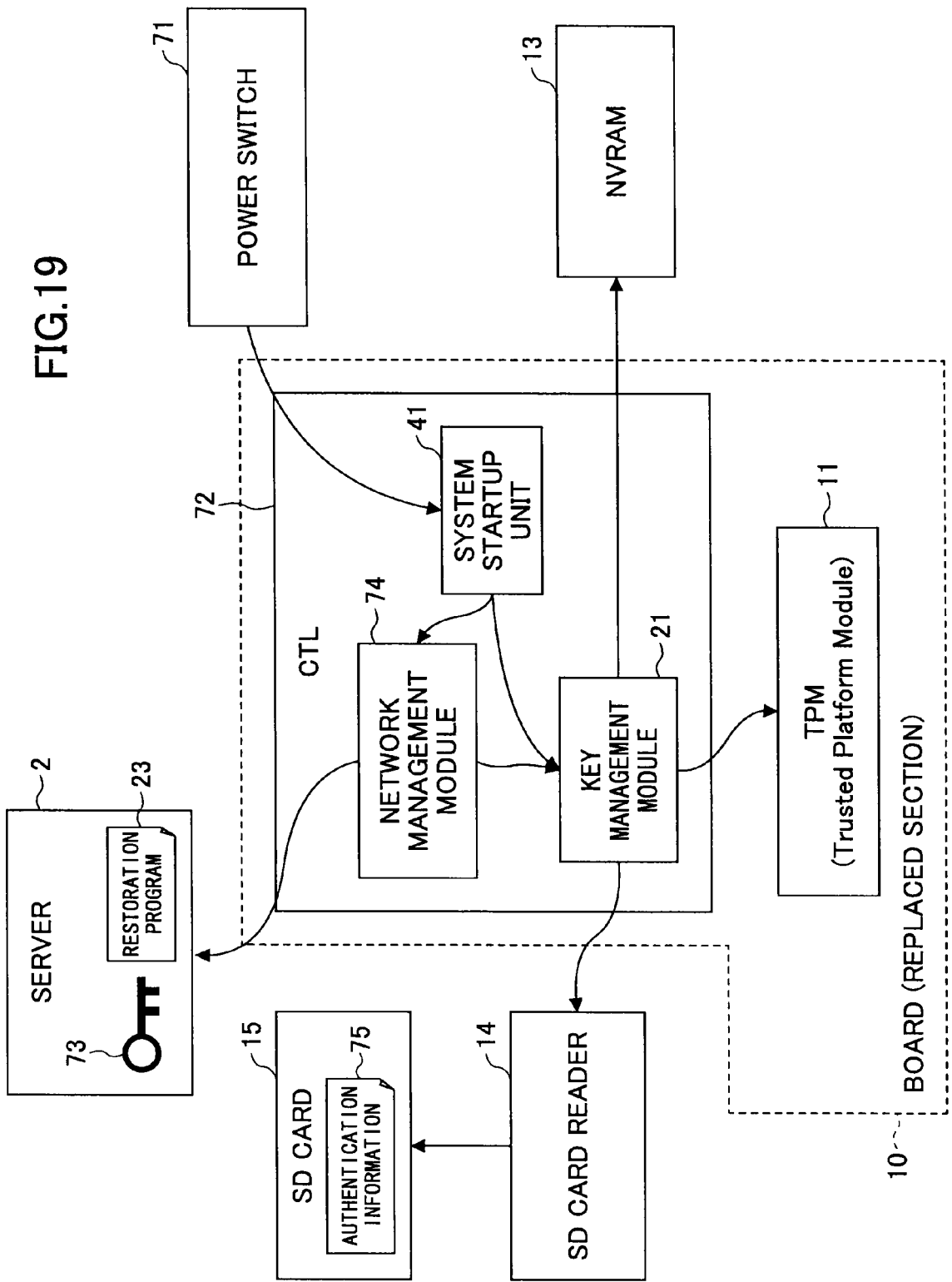
FIG. 19 shows a block diagram of a process of starting up an information processing apparatus according to another embodiment in the restore mode.

FIG. 19 shows a block diagram illustrating a sequence of starting up the information processing apparatus in the restore mode. The information processing apparatus 1 shown in FIG. 19 differs from the information processing apparatus 1 shown in FIG. 14 in that the restore key 73 and the restore program 23 are stored in the server 2 and that the authentication information 75 is stored in the SD card 15.

Figure 20:
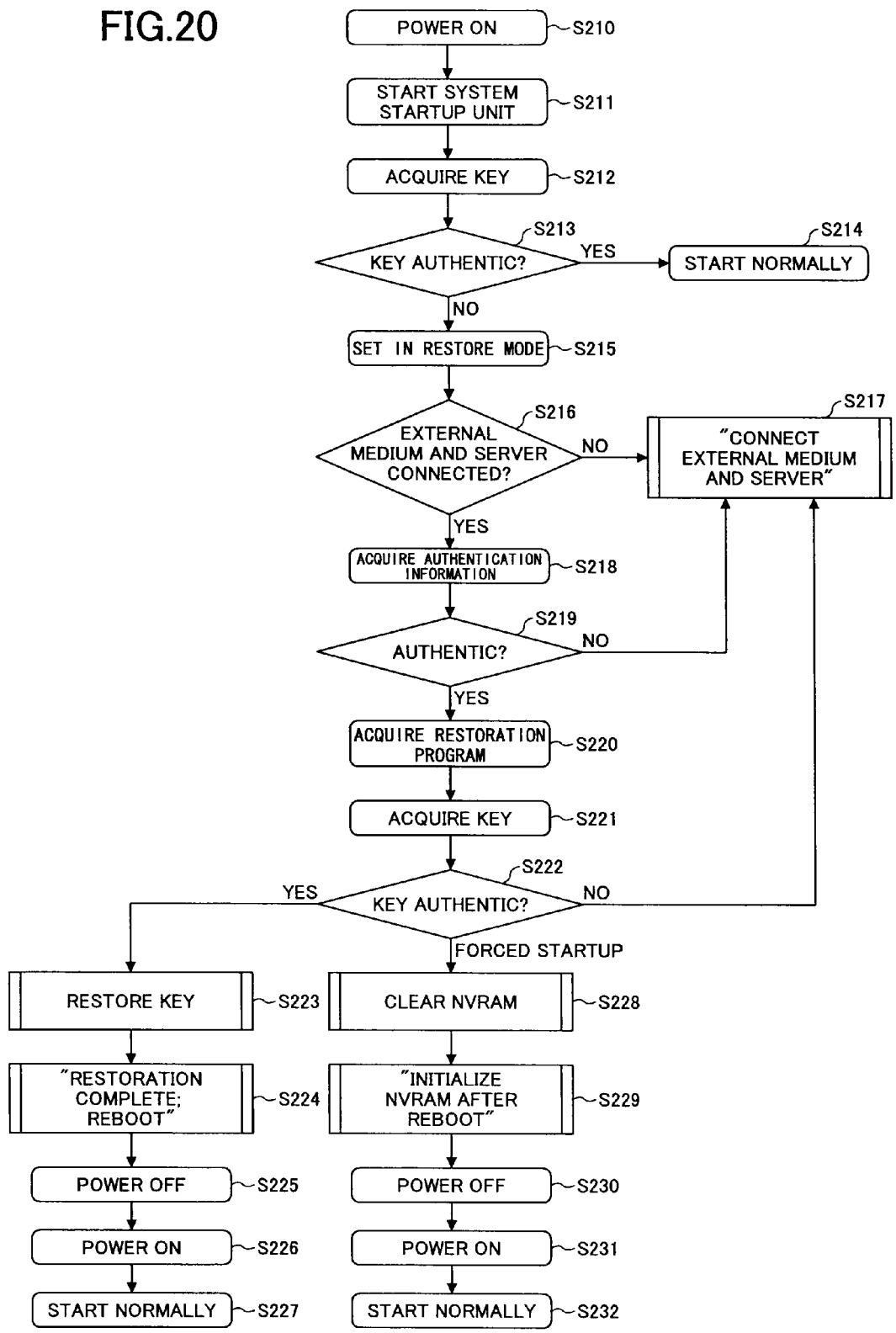
FIG. 20 shows a flowchart of a process of starting up the information processing apparatus of the present embodiment.

FIG. 20 shows a flowchart of a process of starting up the information processing apparatus of the present embodiment. After determining that the SD card 15 and the server 2 are both connected ("YES" in S216), the routine proceeds to step S218 where the authentication information 75 is acquired from the SD card 15 via the SD card reader 14. In step S219, the authentication information 75 is checked.

If the authentication information 75 is not valid ("NO" in S219), the routine returns to step S217 where the operator is notified via a message to the effect that connection with an external storage medium and an external server is necessary. If the authentication information 75 is valid ("YES" in S219), the restore program 23 and the restore key 73 are acquired from the server 2 in step S220. In those respects, the flowchart of FIG. 20 differs from the flowchart of FIG. 15.

Figure 21:
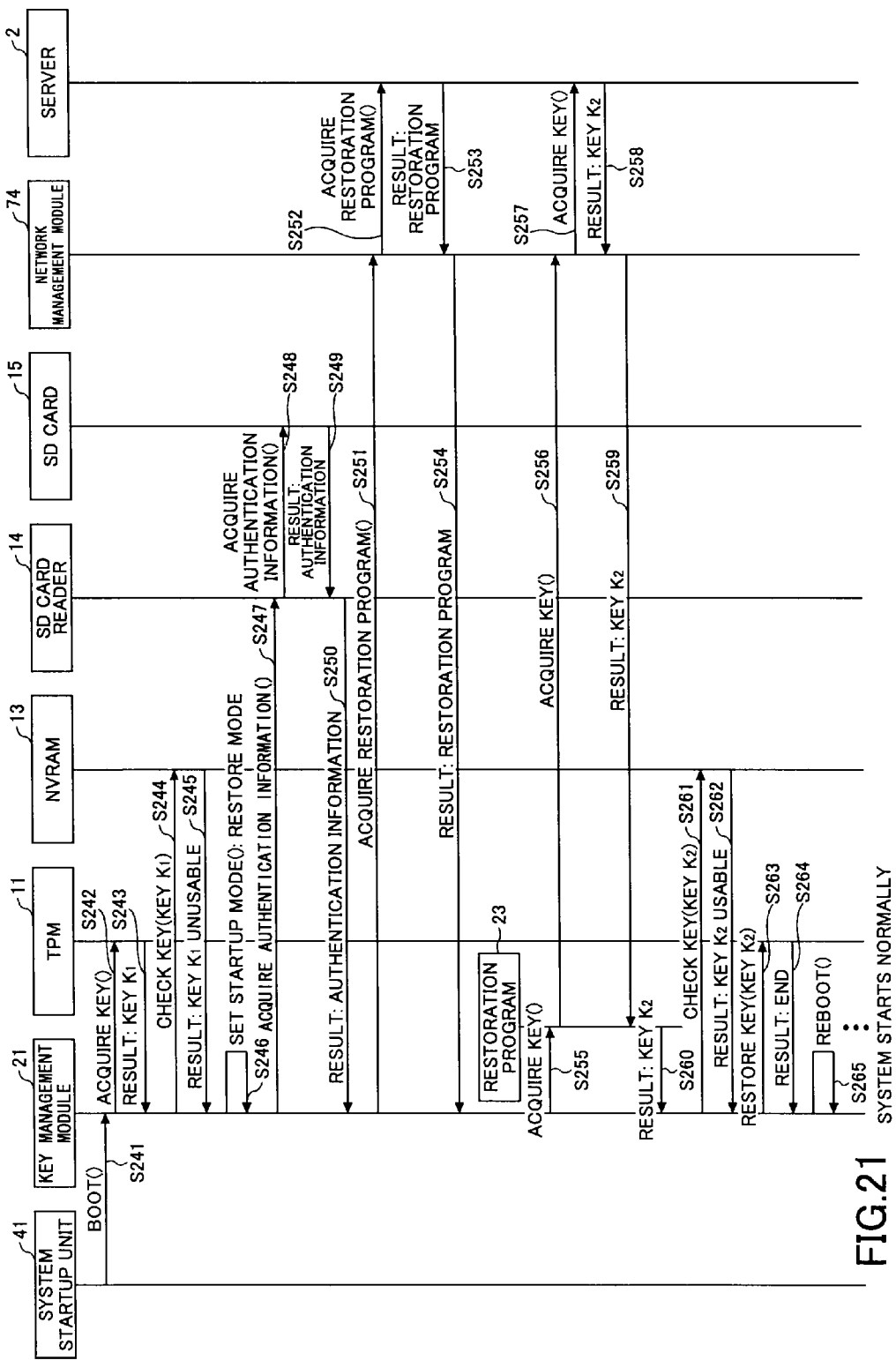
FIG. 21 shows a sequence chart of a process of starting up the information processing apparatus of the present embodiment.

FIG. 21 shows a sequence chart of a process of starting up the information processing apparatus of the present invention. After setting the startup mode in the restore mode in step S246, the key management module 21 acquires the authentication information 75 from the SD card 15 via the SD card reader 14 in steps S247 to S250.

Thereafter, if the authentication information 75 is valid, the key management module 21 acquires the restore program 23 from the server 2 in steps S251 to S254. In steps S255 to S260, the key management module 21 acquires the restore key 73 from the server 2.

In the information processing apparatus 1 of Embodiment 5, since an encryption key can be reintroduced by the restoration of the restore key 73, the data in the NVRAM 13 can be continually utilized even after replacing the controller board 10. Furthermore, since authentication can be performed on the side of the server 2, where the restore key 73 and the restore program 23 are stored, pretenders can be prevented.

Embodiment 6

The information processing apparatus 1 according to Embodiment 6 is similar to the information processing apparatus 1 of Embodiment 1 shown in FIGS. 2 and 3 in respects of the software configuration when started up in the normal mode, and the process of starting up in the normal mode. Since the information processing apparatus 1 of Embodiment 6 is also similar to the information processing apparatus 1 of Embodiment 1 in terms of the drawings to which reference is made in the following, with the exception of some parts, descriptions are omitted whenever appropriate in the following.

Figure 22:
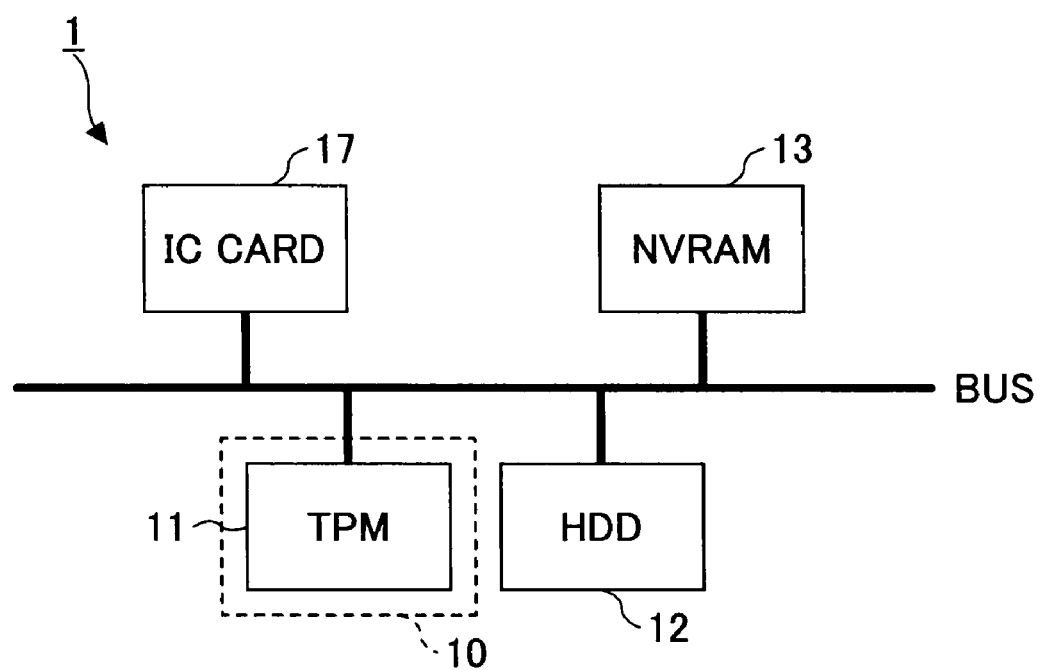
FIG. 22 shows a hardware configuration of the information processing apparatus according to another embodiment of the present embodiment.

FIG. 22 shows a hardware configuration of the information processing apparatus of the present embodiment. The information processing apparatus 1 shown in FIG. 22 differs from the information processing apparatus 1 shown in FIG. 1 in that it comprises an IC card 17 instead of the SD card reader 14 and the SD card 15 shown in FIG. 1.

Figure 23:
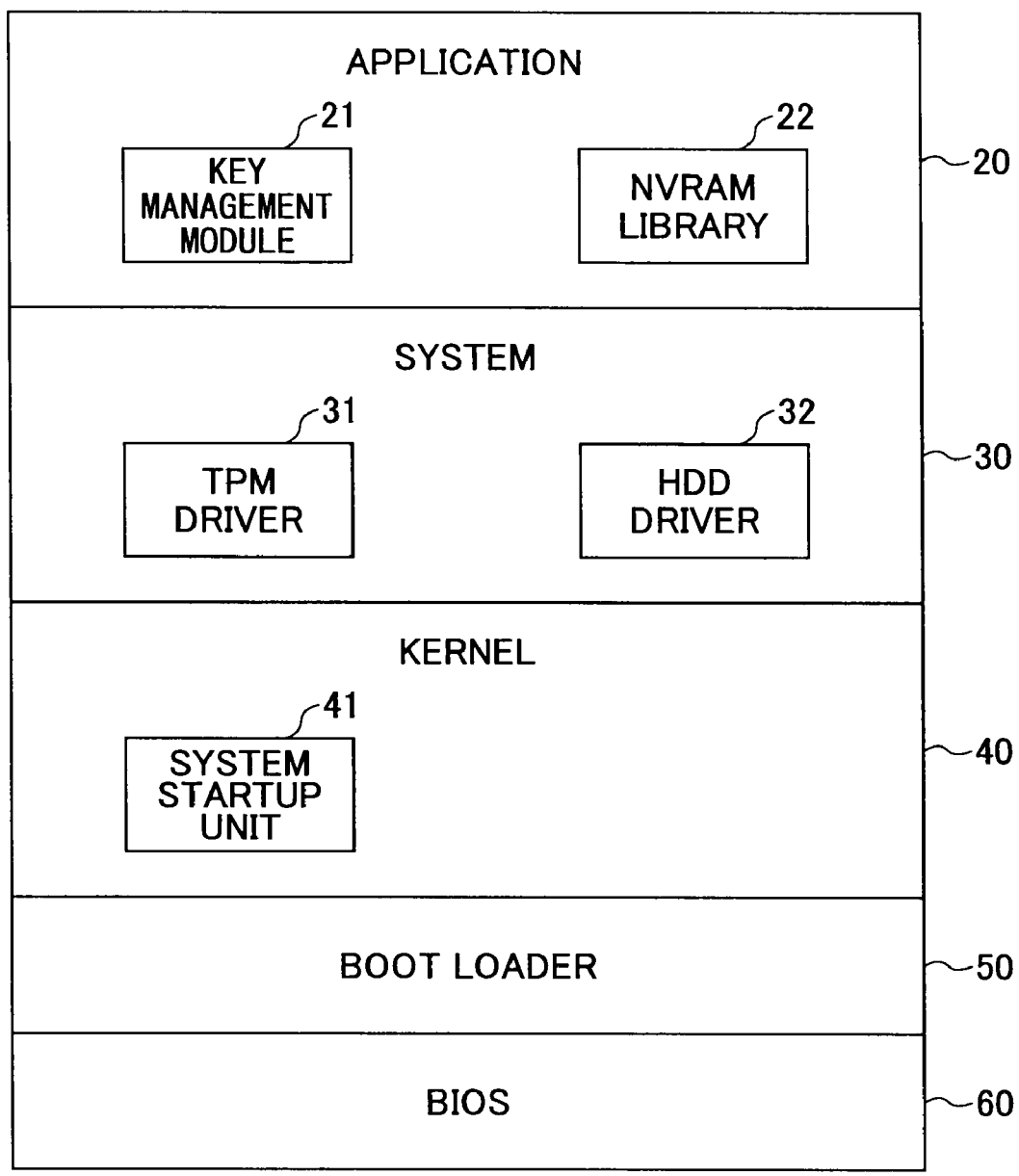
FIG. 23 shows a software configuration of the information processing apparatus when started up in the restore mode.

FIG. 23 shows a software configuration of the information processing apparatus when started up in the restore mode. The configuration shown in FIG. 23 is similar to the software configuration shown in FIG. 4 with the exception that the restore program 23 is removed from the application 20 and that the SD driver 33 is removed from the system 30.

Figure 24:
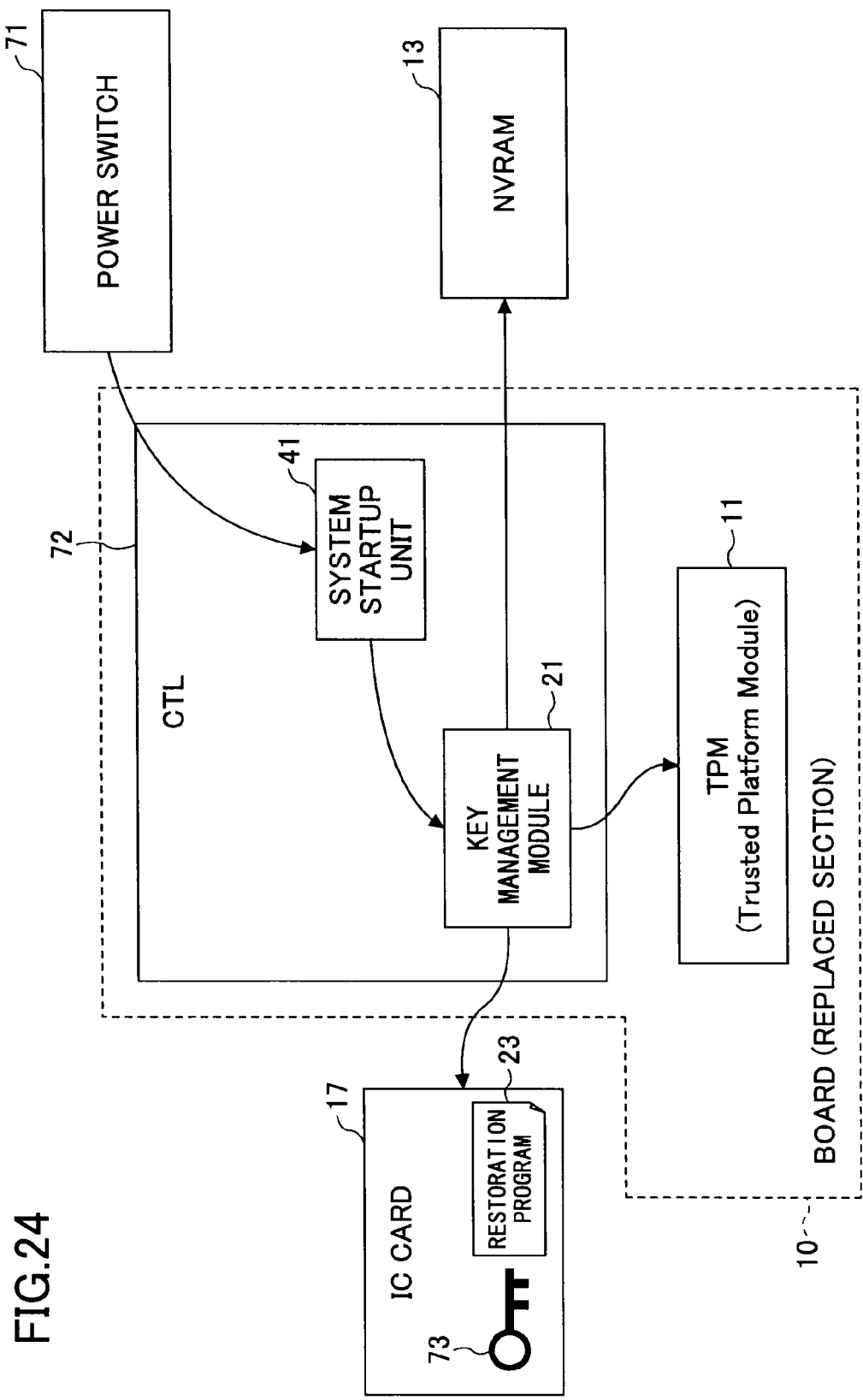
FIG. 24 shows a block diagram illustrating a process of starting up the information processing apparatus in the restore mode.

FIG. 24 shows a block diagram illustrating a sequence of starting up the information processing apparatus in the restore mode. The information processing apparatus 1 shown in FIG. 24 differs from the information processing apparatus 1 shown in FIG. 5 in that the restore program 23 and the restore key 73 are stored in the IC card 17.

Figure 25:
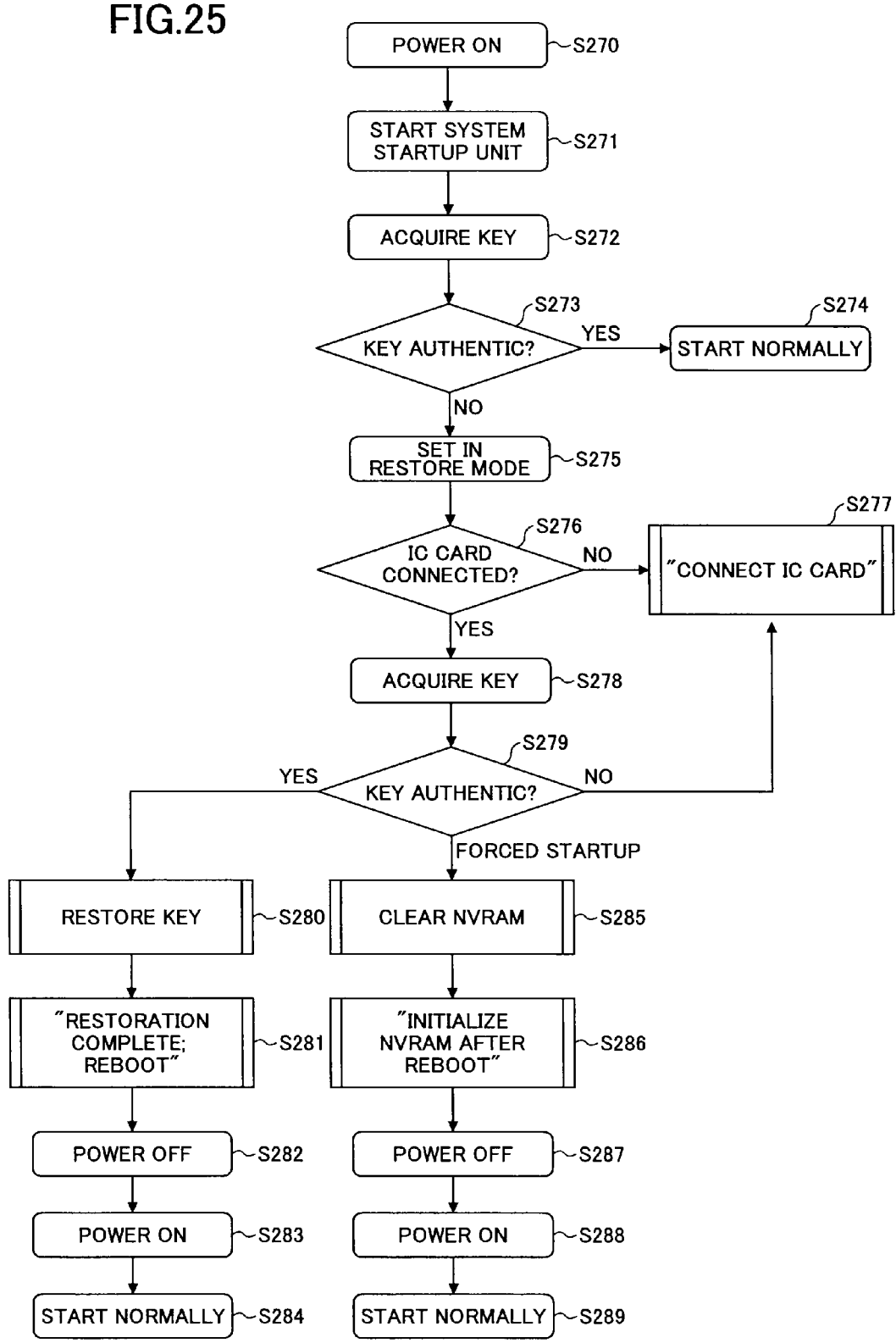
FIG. 25 shows a flowchart of a process of starting up the information processing apparatus of the present embodiment.

FIG. 25 shows a flowchart of a process of starting up the information processing apparatus of the present embodiment. After setting the startup mode in the restore mode in step S275, it is determined in step S276 whether the IC card 17 is connected.

If it is determined that the IC card 17 is not connected ("NO" in S276), the operator is notified in step S277 via a message to the effect that connection of an IC card is necessary. If it is determined that the IC card 17 is connected ("YES" in S276), the restore key 73 is acquired from the IC card 17 in step S278. In those respects, the flowchart of FIG. 25 differs from the flowchart of FIG. 6.

Figure 26:
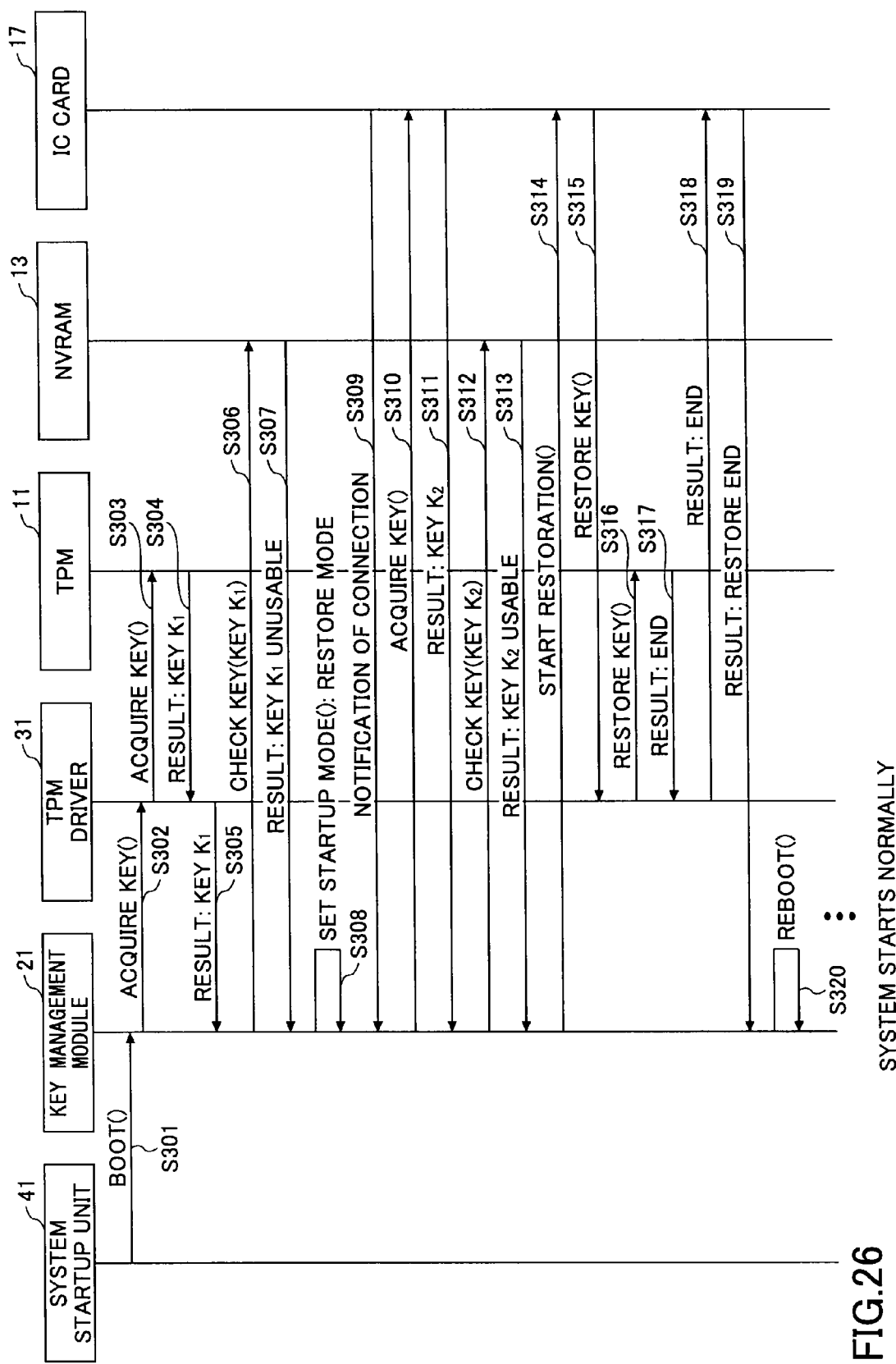
FIG. 26 shows a sequence chart of a process of starting up the information processing apparatus of the present embodiment.

FIG. 26 shows a sequence chart of a process of starting up the information processing apparatus of the present embodiment. After setting the startup mode in the restore mode in step S308, the key management module 21 acquires the restore key 73 from the IC card 17 in steps S309 to S311.

In steps S312 and S313, the key management module 21 checks the validity of the encryption key by determining whether the data stored in the NVRAM 13 can be correctly decrypted with the acquired restore key 73.

If it is determined that the restore key 73 acquired from the IC card 17 is a valid encryption key, the key management module 21 demands that the IC card 17 start a restoration in step S314.

In steps S315 to S318, the restore program 23 in the IC card 17 carries out a restoration of the restore key 73, and stores the restore key 73 in the TPM 11. The restore program 23 is executed by the CPU contained in the IC card 17. After carrying out the restoration of the restore key 73, the IC card 17 notifies the key management module 21 of the end of restoration. Thereafter, the key management module 21 prompts the operator to reboot in step S320, whereby the information processing apparatus 1 is started up in the normal mode.

In the information processing apparatus 1 according to Embodiment 6, since an encryption key can be reintroduced by the restoration of the restore key 73, the data in the NVRAM 13 can be continually utilized even after replacing the controller board 10. Furthermore, the restore program 23 is stored in the IC card 17, so that the restore program 23 can be executed within the IC card 17. Thus, the need to provide the information processing apparatus 1 with a technology for executing the restore program 23 can be eliminated. By performing authentication when the key management module 21 communicates with the IC card 17, pretenders can be prevented.

While the present invention has been described with reference to specific embodiments, it should be obvious to one skilled in the art that various changes and modification can be made without departing from the scope of the invention.

The present application is based on the Japanese Priority Application No. 2007-069645 filed Mar. 16, 2007, the entire contents of which are hereby incorporated by reference.

What is claimed is:

1. An encryption key restoring method for an information processing apparatus in which an encryption key is stored in a secure memory and data encrypted by the encryption key is stored in an internal storage unit, wherein the information processing apparatus comprises a key management module, the method comprising the key management module carrying out:
   - an encryption key checking step of checking the validity of the encryption key;
   - a restore key checking step of acquiring, in the absence of validity in the encryption key, a restore key for the encryption key from outside the information processing apparatus and checking the validity of the restore key;
   - an encryption key restoring step of storing, in the presence of validity in the restore key, the restore key in the secure memory; and
   - a normal startup instructing step of rebooting the information processing apparatus in a normal mode.

2. The encryption key restoring method according to claim 1, wherein the restore key checking step comprises causing a restore program included in the key management module to acquire the restore key for the encryption key from an external storage medium, and checking the validity of the restore key.

3. The encryption key restoring method according to claim 1, wherein the restore key checking step comprises acquiring a restore program from an external storage medium, causing the restore program to acquire the restore key for the encryption key from the external storage medium, and checking the validity of the restore key.

4. The encryption key restoring method according to claim 1, wherein the restore key checking step comprises acquiring a restore program from an external storage medium, causing the restore program to acquire the restore key for the encryption key from an external server via a network, and checking the validity of the restore key.

5. The encryption key restoring method according to claim 1, wherein the restore key checking step comprises acquiring a restore program from an external server via a network, causing the restore program to acquire the restore key for the encryption key from an external storage medium, and checking the validity of the restore key.

6. The encryption key restoring method according to claim 1, wherein the restore key checking step comprises acquiring authentication information from an external storage medium, acquiring a restore program from an external server via a network based on the authentication information, causing the restore program to acquire the restore key for the encryption key from the external server via a network, and checking the validity of the restore key.

7. The encryption key restoring method according to claim 1, wherein the restore key checking step comprises acquiring the restore key for the encryption key from an IC card, and checking the validity of the restore key,
   - and wherein the encryption key restoring step comprises causing a restore program included in the IC card to store the restore key for the encryption key in the secure memory.

8. The encryption key restoring method according to claim 1, further comprising a forced startup instructing step comprising, in the absence of validity in the restore key and in response to an instruction from an operator, initializing the internal storage unit and then starting up the information processing apparatus in a normal mode.

9. The encryption key restoring method according to claim 1, wherein the secure memory is mounted on a controller board for an overall control.

10. An information processing apparatus comprising a secure memory in which an encryption key is stored and an internal storage unit in which data encrypted with the encryption key is stored, the apparatus further comprising a key management module comprising:
    - an encryption key checking unit configured to check the validity of the encryption key;
    - a restore key checking unit configured to, in the absence of validity in the encryption key, acquire a restore key for the encryption key from outside the information processing apparatus, and check the validity of the restore key;
    - an encryption key restoring unit configured to store, in the presence of validity in the restore key, the restore key in the secure memory; and
    - a normal startup instruction unit configured to reboot the information processing apparatus in a normal mode.

* * * * *